(12) United States Patent
Otsuka et al.

(10) Patent No.: US 8,995,791 B2
(45) Date of Patent: Mar. 31, 2015

(54) IMAGE PROCESSING APPARATUS, IMAGE PROCESSING METHOD, AND COMPUTER-READABLE RECORDING MEDIUM

(75) Inventors: Aiko Otsuka, Kanagawa (JP); Atsushi Itoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 233 days.

(21) Appl. No.: 13/483,949

(22) Filed: May 30, 2012

(65) Prior Publication Data
US 2012/0308159 A1 Dec. 6, 2012

(30) Foreign Application Priority Data
May 30, 2011 (JP) .................... 2011-120740

(51) Int. Cl.
G06K 9/32 (2006.01)
G06T 3/40 (2006.01)
G06T 11/60 (2006.01)

(52) U.S. Cl.
CPC .. *G06T 3/40* (2013.01); *G06T 11/60* (2013.01)
USPC .......................................... 382/296; 382/298

(58) Field of Classification Search
USPC .................... 382/293, 296, 297, 298, 307
See application file for complete search history.

(56) References Cited

U.S. PATENT DOCUMENTS

| | | | | |
|---|---|---|---|---|
| 4,631,751 A * | 12/1986 | Anderson et al. | ............. | 382/298 |
| 4,912,771 A * | 3/1990 | Komine et al. | ............... | 382/296 |
| 5,133,025 A * | 7/1992 | Koyama et al. | ............... | 382/296 |
| 5,680,225 A | 10/1997 | Hirabayashi et al. | | |
| 5,867,612 A * | 2/1999 | Robson | ......................... | 382/298 |
| 6,493,472 B1* | 12/2002 | Takagi et al. | ................. | 382/317 |
| 2002/0044687 A1 | 4/2002 | Federman | | |
| 2007/0269124 A1 | 11/2007 | Li et al. | | |
| 2008/0240569 A1* | 10/2008 | Tonouchi | ..................... | 382/186 |

FOREIGN PATENT DOCUMENTS

| | | |
|---|---|---|
| CN | 1489751 A | 4/2004 |
| CN | 1946132 A | 4/2007 |
| JP | 2001-43000 | 2/2001 |
| JP | 2009-131596 | 6/2009 |
| JP | 2009-273859 | 11/2009 |

OTHER PUBLICATIONS

Extended European Search Report issued Oct. 16, 2012, in Application No. / Patent No. 12169929.2-2218.

(Continued)

*Primary Examiner* — Yon Couso
(74) *Attorney, Agent, or Firm* — Oblon, McClelland, Maier & Neustadt, L.L.P.

(57) ABSTRACT

An image processing apparatus includes an exaggeration unit configured to perform on an original image including a hand-drawn element an exaggeration process that expands the hand-drawn element to generate an exaggerated image; and a reduction unit configured to reduce the exaggerated image to generate a reduced image of a predetermined size smaller than a size of the original image.

17 Claims, 21 Drawing Sheets
(9 of 21 Drawing Sheet(s) Filed in Color)

(56) References Cited

OTHER PUBLICATIONS

Kazuaki Suzuki, et al., "Downscaling for images having thin line structure", NPAR 2007, 5$^{th}$ International Symposium on Non-Photorealistic Animation and Rendering, XP55040097, Jan. 1, 2007, Retrieved from the Internet: URL:http://www.img.cs.titech.ac.jp/"suzuki/research/pixelart/npar2007poster.pdf[retrieved on Oct. 4, 2012], 1 page.

Combined Chinese Office Action and Search Report issued Mar. 17, 2014 in Patent Application No. 201210172050.9 (with English language translation).

* cited by examiner

| 255 | 200 | 160 | 0 | 8 |
|---|---|---|---|---|
| 255 | 190 | 15 | 10 | 150 |
| 250 | 180 | 10 | 12 | 200 |
| 200 | 12 | 10 | 180 | 254 |
| 10 | 12 | 175 | 200 | 255 |

(b)

| 190 | 15 | 0 | 0 | 0 |
|---|---|---|---|---|
| 180 | 10 | 0 | 0 | 0 |
| 12 | 10 | 10 | 10 | 10 |
| 12 | 10 | 10 | 10 | 12 |
| 10 | 10 | 10 | 10 | 180 |

FIG.7

FIG.17
(a)
| NUMBER OF IMAGES | DISPLAY TIME PER IMAGE |
|---|---|
| UNIT: FRAME | UNIT: 1/100 sec |
| NUMBER OF EXAGGERATION TIMES | ROTATION ANGLE | SIZE | AMOUNT OF MOVE (X DIRECTION) | AMOUNT OF MOVE (Y DIRECTION) |
|---|---|---|---|---|
| 0 TO 30 | UNIT: DEGREE | 1 TO 30 | UNIT: DOT | UNIT: DOT |
(b)
```
4, 50
7, 5, 20, 0, 0
6, 0, 20, 0, 0
7, 5, 20, 0, 0
6, 0, 20, 0, 0
```
FIG.18
(a)
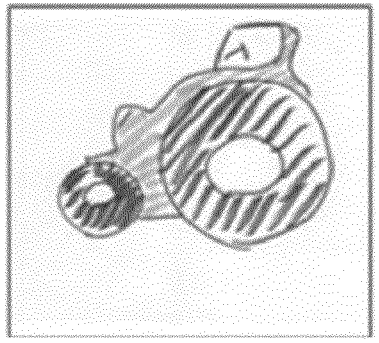
(b)
15 DEGREES ROTATION
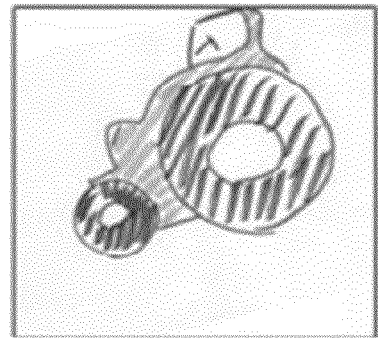

FIG.24
(a) 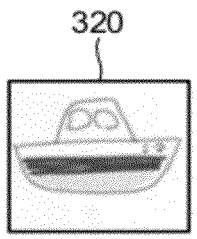
320
(b)
| | 7 TIMES EXAGGERATION | 9 TIMES EXAGGERATION |
|---|---|---|
| 0 DEGREES |  | |
| 15 DEGREES |  |  |
| 30 DEGREES |  |  |
| 45 DEGREES |  |  |
| 60 DEGREES |  |  |
| 75 DEGREES |  |  |
| 90 DEGREES |  | |
(c) 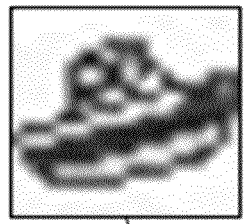 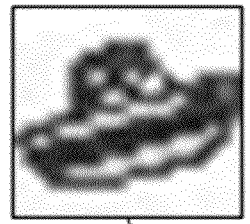
321a          321b

FIG.27
(a)
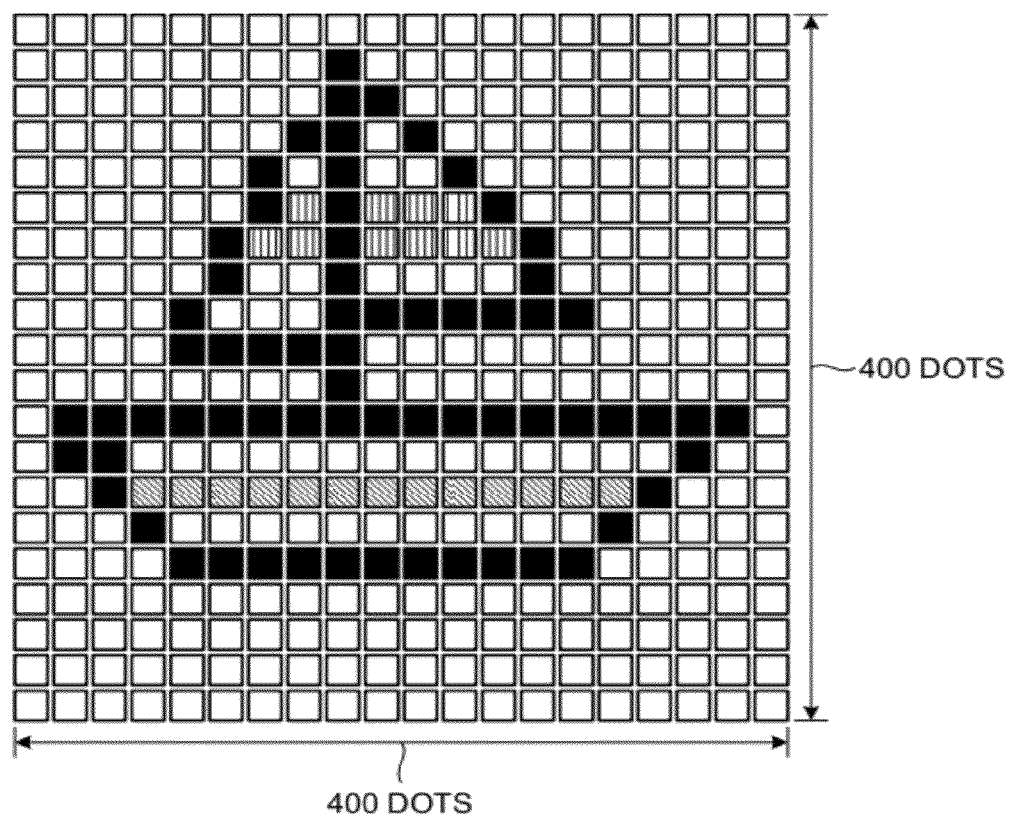
400 DOTS
400 DOTS
(b)
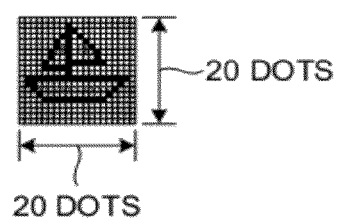
20 DOTS
20 DOTS

IMAGE PROCESSING APPARATUS, IMAGE PROCESSING METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2011-120740 filed in Japan on May 30, 2011.

BACKGROUND OF THE INVENTION

1. Field of the Invention

The present invention relates to an image processing apparatus, an image processing method, and a computer-readable recording medium.

2. Description of the Related Art

In e-mail and the like, pictographic images are often inserted in sentences created. Pictographic images are images of faces in various expressions, animals, symbols, items, and such designed in font sizes typically used in documents and are displayed together with text by a supporting application. As an example, an e-mail function installed in a cellular phone terminal uses pictographic images of 20 dots high by 20 dots wide. Pictographic images used in a document can provide the document with a wider range of expression, resulting in being widely used.

Japanese Patent Application Laid-open No. 2001-043000 discloses a mail tool that allows a hand-drawn image entered using a pen-input tablet to be written into an e-mail document being created with e-mail creation software. According to Japanese Patent Application Laid-open No. 2001-043000, a user can send images created by hand-drawing by pasting the images in an e-mail document.

To create eye-friendly pictographic images as intended by the user using a limited number of dots, such as 20 dots high by 20 dots wide described above, requires skill and is very difficult in general. For example, to represent a given shape by a pictographic image, the user needs to decide a color for each dot considering an overall appearance and to appropriately select parts to be omitted.

As an example, as illustrated in (a) of FIG. 27, a grid having the number of cells corresponding to the horizontal and vertical dot sizes of a pictograph is prepared in a certain degree of size (in this example, 400 dots high by 400 dots wide) so as to be easily operated and recognized by the user. The user selects and sets a color for each of the cells of the grid to draw an image to be an original of the pictographic image intended. In (b) of FIG. 27, illustrated is an example of a pictographic image of 20 dots high by 20 dots wide created in such a manner.

In this method, creating a pictograph requires operation on the individual cells, resulting in extremely time consuming. Furthermore, it is difficult to depict a curved line or a straight line having a given angle with a small number of dots, and a part that is necessary to omit may arise in some cases. It is, therefore, very difficult to create a pictographic image of a given shape in a well-balanced form.

Meanwhile, it is conceivable to produce a pictographic image by creating an original image that is large enough to draw easily using continuous curves and lines and reducing the original image thus created to 20 dots high by 20 dots wide, for example. In this case, when a reduction process is simply performed on the image of a large size, the reduced image may look like a faded graphic because necessary lines are dropped out and such, and thus become indistinct.

An example of reduction to one-twentieth of an original image of 400 dots high by 400 dots wide both horizontally and vertically to produce a pictographic image of 20 dots high by 20 dots wide is considered. In this case, for example, a line of less than 20 dots wide in the original image becomes less than one dot wide after being reduced, and this line may in effect disappear by an interpolation process and such during the reduction process.

In Japanese Patent Application Laid-open No. 2001-043000, images created by hand-drawing are written directly to an e-mail document without undergoing a reduction process. As a result, text and images are displayed in uneven sizes. Moreover, when a plurality of images are written in a single e-mail document, in addition to the uneven sizes of the text and the images, the sizes among the images can be also inconsistent.

Therefore, there is a need for solution to reduce visibility degradation in a reduced image the size of which is reduced from that of an original image to fit in a display size.

SUMMARY OF THE INVENTION

It is an object of the present invention to at least partially solve the problems in the conventional technology.

According to an embodiment, there is provided an image processing apparatus that includes an exaggeration unit configured to perform on an original image including a hand-drawn element an exaggeration process that expands the hand-drawn element to generate an exaggerated image; and a reduction unit configured to reduce the exaggerated image to generate a reduced image of a predetermined size smaller than a size of the original image.

According to another embodiment, there is provided an image processing method that includes performing on an original image including a hand-drawn element an exaggeration process that expands the hand-drawn element to generate an exaggerated image; and reducing the exaggerated image to generate a reduced image of a predetermined size smaller than a size of the original image.

According to still another embodiment, there is provided a non-transitory computer-readable recording medium with an executable program stored thereon. The program instructs a computer to perform performing on an original image including a hand-drawn element an exaggeration process that expands the hand-drawn element to generate an exaggerated image; and reducing the exaggerated image to generate a reduced image of a predetermined size smaller than a size of the original image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 6 and 7 illustrate an exaggeration process performed on a grayscale image;

FIG. 17 illustrates an example of setting information;

FIG. 18 illustrates the rotation of an image;

FIG. 24 illustrates adjustment of degree of exaggeration corresponding to an angle of rotation;

FIG. 27 illustrates an example of creating a pictographic image according to a conventional technology.

DETAILED DESCRIPTION OF THE PREFERRED EMBODIMENTS

Exemplary embodiments of the present invention will be described in detail below with reference to the accompanying drawings. In the embodiments, a pictographic image in a size of, for example, 20 dots high by 20 dots wide is generated based on an original image drawn with continuous lines and curves. An exaggeration process is performed on the original image to exaggerate a drawn element, and then the exaggerated image is reduced to 20 dots high by 20 dots wide to generate a desired pictographic image. Because the reduction process to the size of the pictographic image is carried out after the drawn element of the original image is exaggerated, the necessary lines in the original image can be prevented from being dropped out, whereby an eye-friendly pictographic image can be obtained.

Figure 1:
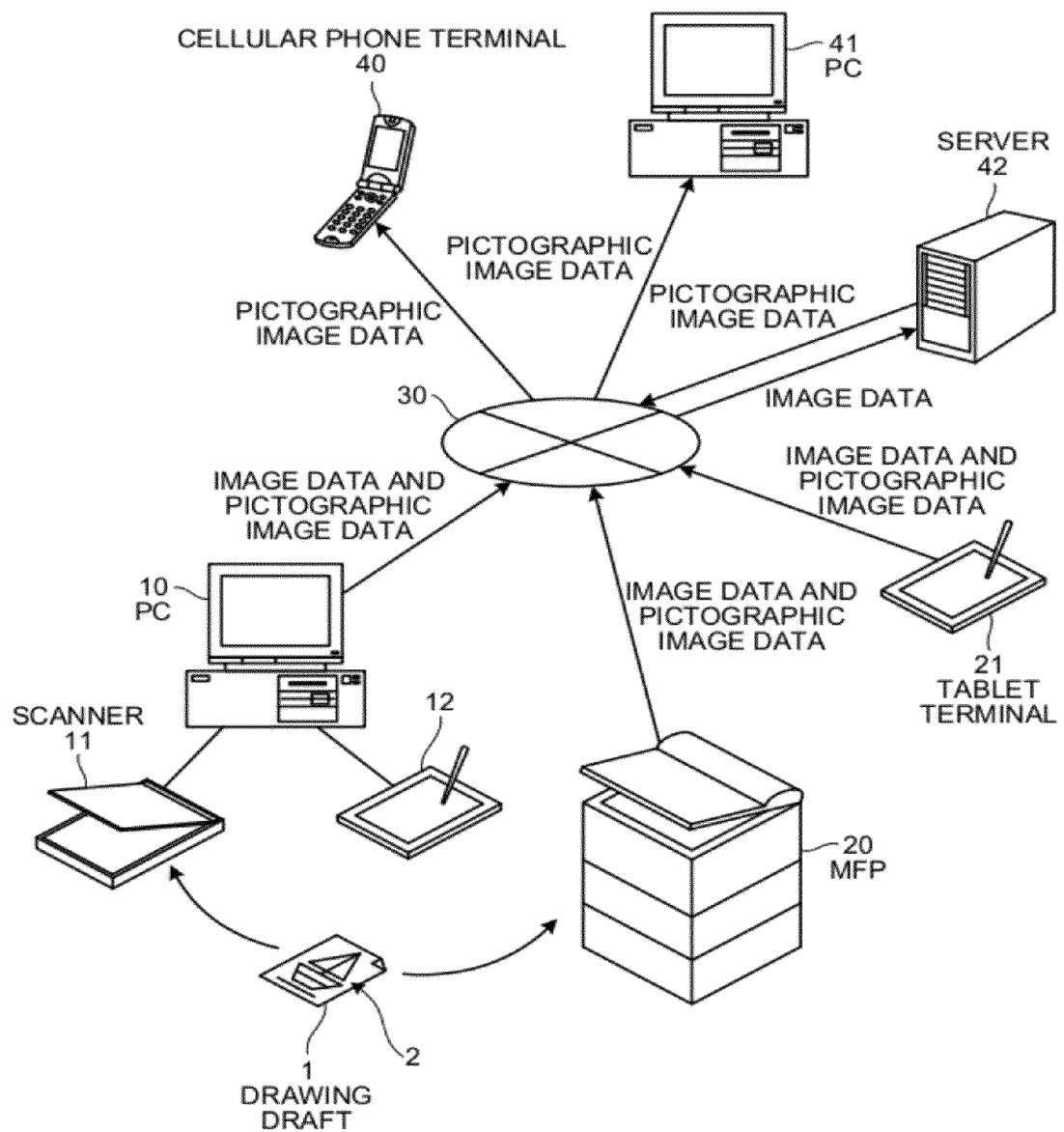
FIG. 1 is a diagram schematically illustrating an example of a usage style in each embodiment of the invention.

FIG. 1 illustrates an example of a usage style in each of the embodiments of the invention. A personal computer (PC) 10, a multifunction printer (MFP) 20, and a tablet terminal 21 are examples of an apparatus that creates an original image to be an original of a pictographic image and generates a pictographic image from the original image created. The MFP 20 is an apparatus having a plurality of functions such as a printer function, a scanner function, a copier function, a facsimile function, and a communication function in a single housing. Meanwhile, each of a cellular phone terminal 40 and a PC 41 is an example of an apparatus that creates documents and the like using the pictographic images generated by the PC 10, the MFP 20, and the tablet terminal 21.

For example, the pictographic images generated by the PC 10, the MFP 20, or the tablet terminal 21 are transmitted to the cellular phone terminal 40 or the PC 41 via a network 30 such as the Internet. The cellular phone terminal 40 and the PC 41 receive and store therein the pictographic images transmitted via the network 30, and use the pictographic images when creating documents. For example, the cellular phone terminal 40 and the PC 41 insert the stored pictographic images into an e-mail document, and then transmit the e-mail.

The method of generating a pictographic image is schematically explained. For example, a user prepares a draft drawing 1 drawn on paper and such with a design 2 desired to make a pictographic image using a marker pen and the like, and makes a scanner 11 connected to the PC 10 reads the draft drawing 1. The content of the design 2 to make a pictographic image is not particularly restricted. For example, pictures, diagrams, letters, and symbols can be used as the design 2.

The PC 10 is installed with an image processing program that carries out the generation of pictographic images according to the embodiments of the invention, and receives a drawing image data of the draft drawing 1 read by the scanner 11. The PC 10, by the image processing program, extracts a predetermined area that includes the drawn element of the design 2 from the drawing image data received as an original image to be the original of pictographic image, performs an exaggeration process on the original image to generate an exaggerated drawn element, and reduces the exaggerated drawn image to the size of a pictographic image to generate the pictographic image.

The design 2 to be the original of pictographic image is not restricted to be drawn on paper and such. For example, the design 2 may be drawn using a pointing device such as a pen tablet 12 connected to the PC 10, and an original image may be created directly as electronic data. For example, the user starts up drawing software on the PC 10 and draws the design 2 using the pen tablet 12. The drawing software generates an original image that includes the drawn element of the design 2 in response to the drawing with the pen tablet 12. The PC 10 generates a pictographic image by the image processing program based on the original image. Similarly, a pictographic image can be generated using the tablet terminal 21 that is integrally formed with a display device and a tablet and internally has functions equivalent to those of a computer.

A pictographic image can also be generated using the MFP 20. In the MFP 20, the image processing program that carries out the generation of pictographic images according to the embodiments of the invention is installed in advance. For example, the user makes the MFP 20 read, using the scanner function, the draft drawing 1 drawn with the design 2 desired to make a pictographic image. The MFP 20 performs extraction of an original image, an exaggeration process, and a reduction process on drawing image data of the draft drawing 1 read by the scanner function by the image processing program similarly to the foregoing to generate a pictographic image.

The process of making pictographic images may be carried out at a place different from the place where an original image for making a pictographic image is received. In the example in FIG. 1, for example, the image processing program according to the embodiments of the invention is installed in a server 42 connected to the network 30 in advance. The PC 10, the MFP 20, and the tablet terminal 21, upon receiving the data for an image that includes the drawn element of the design 2, transmit the received image data directly or after compression coding to the server 42 via the network 30.

The server 42 receives the image data transmitted via the network 30, extracts a predetermined area including the drawn element of the design 2 in the received image data as original image data, and performs on the original image data the above-described exaggeration process and the reduction process to obtain pictographic image data of a pictographic image of, for example, 20 dots high by 20 dots wide. The pictographic image data is then transmitted to the cellular phone terminal 40 and/or the PC 41 via the network 30. Consequently, a pictographic image based on the design 2 drawn by the user can be obtained without the image processing program being installed in the PC 10, the MFP 20, and the tablet terminal 21.

First Embodiment

Figure 2:
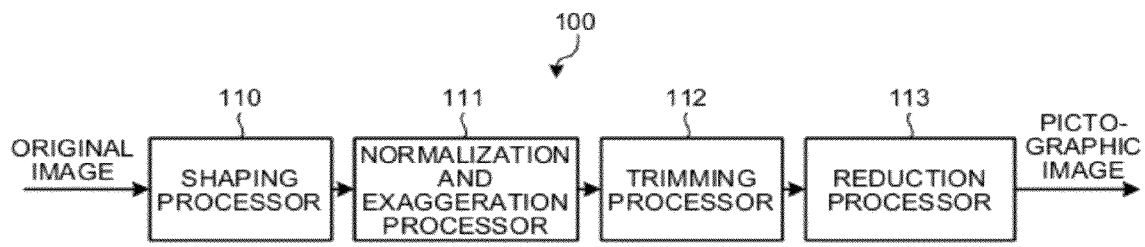
FIG. 2 is a functional block diagram illustrating an example of functions of an image processing apparatus according to a first embodiment.

A first embodiment of the invention will be described. In the first embodiment, a pictographic image as a still image is generated based on the design 2 drawn by the user. FIG. 2 is a functional block diagram illustrating an example of functions of an image processing apparatus 100 according to the first embodiment. The image processing apparatus 100 includes a shaping processor 110, a normalization and exaggeration processor 111, a trimming processor 112, and a reduction processor 113.

The shaping processor 110, when an original image received is not in a square shape, adds blanks to top and bottom of or left and right of the image to create a square-shaped image that includes the original image. The normalization and exaggeration processor 111 performs a normalization process that normalizes the number of dots on the image shaped by the shaping processor 110, and then performs an exaggeration process to create an image including the drawn element of the design 2 which is exaggerated. The exaggeration process, for example, is a process to make the widths of lines constituting the drawn element thick. The detail of the exaggeration process will be described later.

The trimming processor 112 cuts out a necessary part from the image created by the normalization and exaggeration processor 111. The necessary part, for example, is a smallest square area with blank areas included in the image being removed. The trimming processor 112 performs an enlargement or reduction process on the image of the necessary part trimmed from the image to create an image of a predetermined size. The reduction processor 113 performs a reduction process on the image created by the trimming processor 112 to generate a pictographic image of, for example, 20 dots high by 20 dots wide.

Figure 3:
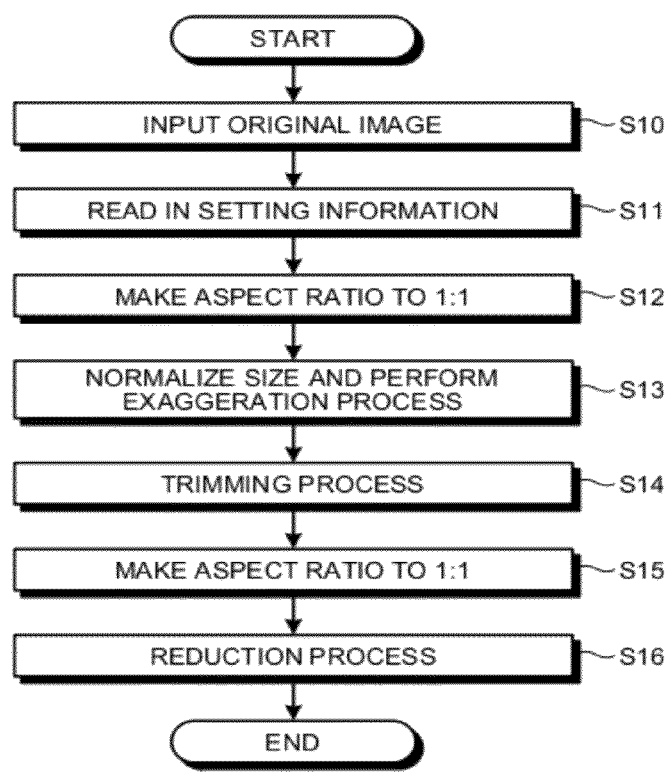
FIG. 3 is a flowchart illustrating an example of a pictographic image generating method in the first embodiment.

FIG. 3 is a flowchart illustrating an example of a pictographic image generating method according to the first embodiment. In the first embodiment, a pictographic image is generated using the PC 10 and the scanner 11 illustrated in FIG. 1. In this case, the respective units constituting the image processing apparatus 100 are loaded into a main memory of the PC 10 as modules of the image processing program installed in the PC 10.

Prior to the execution of the flowchart in FIG. 3, a user prepares the draft drawing 1 drawn on paper with the design 2 desired to make a pictographic image using a marker pen and the like. The user then inputs to the PC 10 drawing image data of the draft drawing 1 read by the scanner 11. The PC 10 extracts from the drawing image data a predetermined area including the drawn element of the design 2 as an original image.

Figure 4:
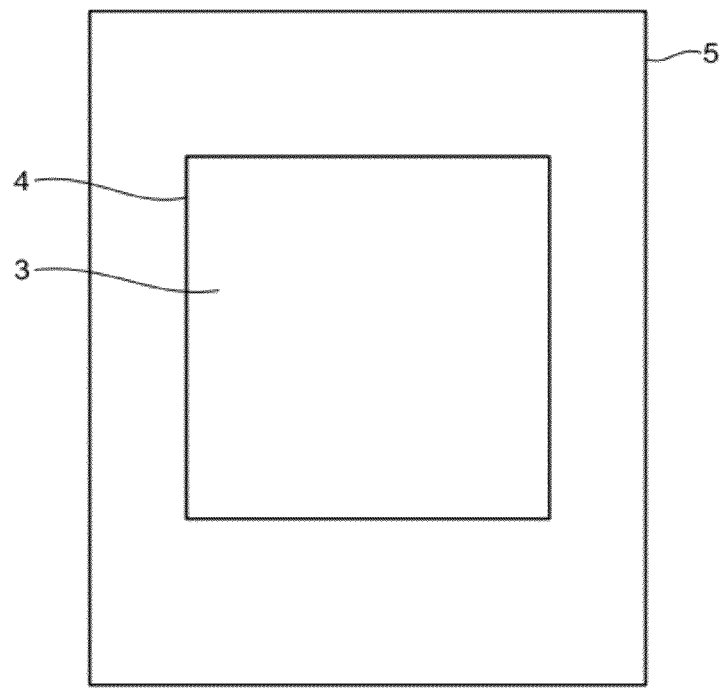
FIG. 4 is a diagram for explaining an example of a form to draw a design.

The paper on which the design 2 is drawn is not particularly restricted. However, for example, as illustrated in FIG. 4, it is preferable to use a dedicated form 5 printed with a frame 4 indicative of a drawing area 3 the size of which is predetermined because it facilitates the process of extracting an original image from the drawing image data of the draft drawing 1 read by the scanner 11. The size of the original image depends on the resolution of the scanner 11 when reading the draft drawing 1. As an example, when the resolution of the scanner 11 reading the draft drawing 1 is 100 dots per inch (dpi), the size of the form 5 is A4 paper size, and the size of the frame 4 is five inches long by six inches wide, the size of the original image comes to 500 dots high by 600 dots wide.

As for the drawing area 3, it is preferable to set a background color in a predetermined color because the processes such as an exaggeration process by the normalization and exaggeration processor 111 and a trimming process by the trimming processor 112 are made easier. In general, when a drawing is made using a marker pen and the like, the color of the drawn element becomes dark (brightness value is lowered), and thus, the background color is set to, for example, white or a light color the brightness value of which is higher than a given value.

In the flowchart in FIG. 3, at Step S10, an original image is input to the image processing apparatus 100, and at the following Step S11, setting information is read in by a CPU or other component (not depicted) that controls the whole image processing apparatus 100. The setting information includes a value indicative of the number of exaggeration processes carried out by the normalization and exaggeration processor 111. The number of exaggeration processes is selected, for example, from a range of 0 to 30 times.

The original image input to the image processing apparatus 100 is transmitted to the shaping processor 110. At Step S12, the shaping processor 110 carries out a shaping process that adds blanks to the original image supplied to make an image in a square shape in which a ratio of the number of horizontal and vertical dots is 1:1.

Figure 5:
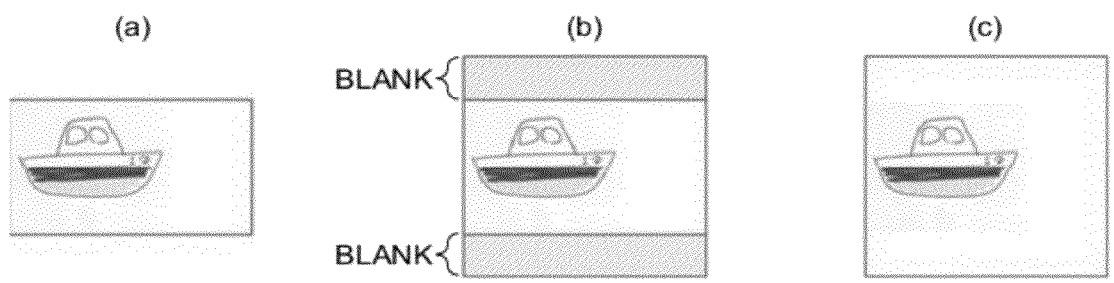
FIG. 5 illustrates a shaping process performed in a shaping processor.

Referring to FIG. 5, a shaping process in the shaping processor 110 will be described. In (a) of FIG. 5, an example of an original image is illustrated. As illustrated, the original image may not be in a square shape. The shaping processor 110, for an original image that is not square, as exemplified in (b) of FIG. 5, adds blanks of an equal width to its both top and bottom or left and right to create an image in a square shape ((c) of FIG. 5).

At the following Step S13, the normalization and exaggeration processor 111 performs a normalization process on the square image created at Step S12, and then performs an exaggeration process on the resulting image to exaggerate the drawn element included in the image.

A normalization process will be schematically explained. The normalization process is a process to convert the resolution of an image (number of horizontal and vertical dots) to a predetermined value. As described later, the normalization and exaggeration processor 111 replaces, for an image, a pixel value of a pixel of interest with a pixel value of a neighboring pixel of the pixel of interest to perform an exaggeration process that thickens the widths of lines of the drawn element included in the image. For example, when the draft drawing 1 is read by the scanner 11, the number of dots included in the line width of the lines of the same thickness on the draft drawing 1 is larger as the resolution of reading is higher. Consequently, the effect of exaggeration process appears more pronouncedly as the resolution when reading the draft drawing 1 is lower.

Accordingly, at Step S13, prior to carrying out an exaggeration process, for the image subject to the exaggeration process, a resolution converting process that converts the resolution of the image to a predetermined resolution is carried out to perform the normalization. On the image the resolution of which is thus normalized, the exaggeration process is performed.

The exaggeration process will be described in detail. The exaggeration process carried out by the normalization and exaggeration processor 111 is a process to thicken the line widths of the lines drawn. Thickening the line widths of the drawn lines by the exaggeration process makes the drawn element expand as compared with that of before the exaggeration process. Accordingly, the drawn element is exaggerated.

The exaggeration process is a process, when the background color is white or a light color, to set a pixel value of a pixel of interest to the lowest pixel value out of pixel values of nine pixels made up of the pixel of interest and eight neighboring pixels surrounding the pixel of interest. For example, in a binary image, when there is even one pixel in black (pixel value=0) present in nine pixels made up of a pixel of interest and eight pixels surrounding the pixel of interest, the pixel of interest is set to black. In a grayscale image, the lowest brightness value (pixel value) out of brightness values of nine pixels made up of a pixel of interest and eight pixels surrounding the pixel of interest is set as the brightness value of the pixel of interest.

Figure 7:
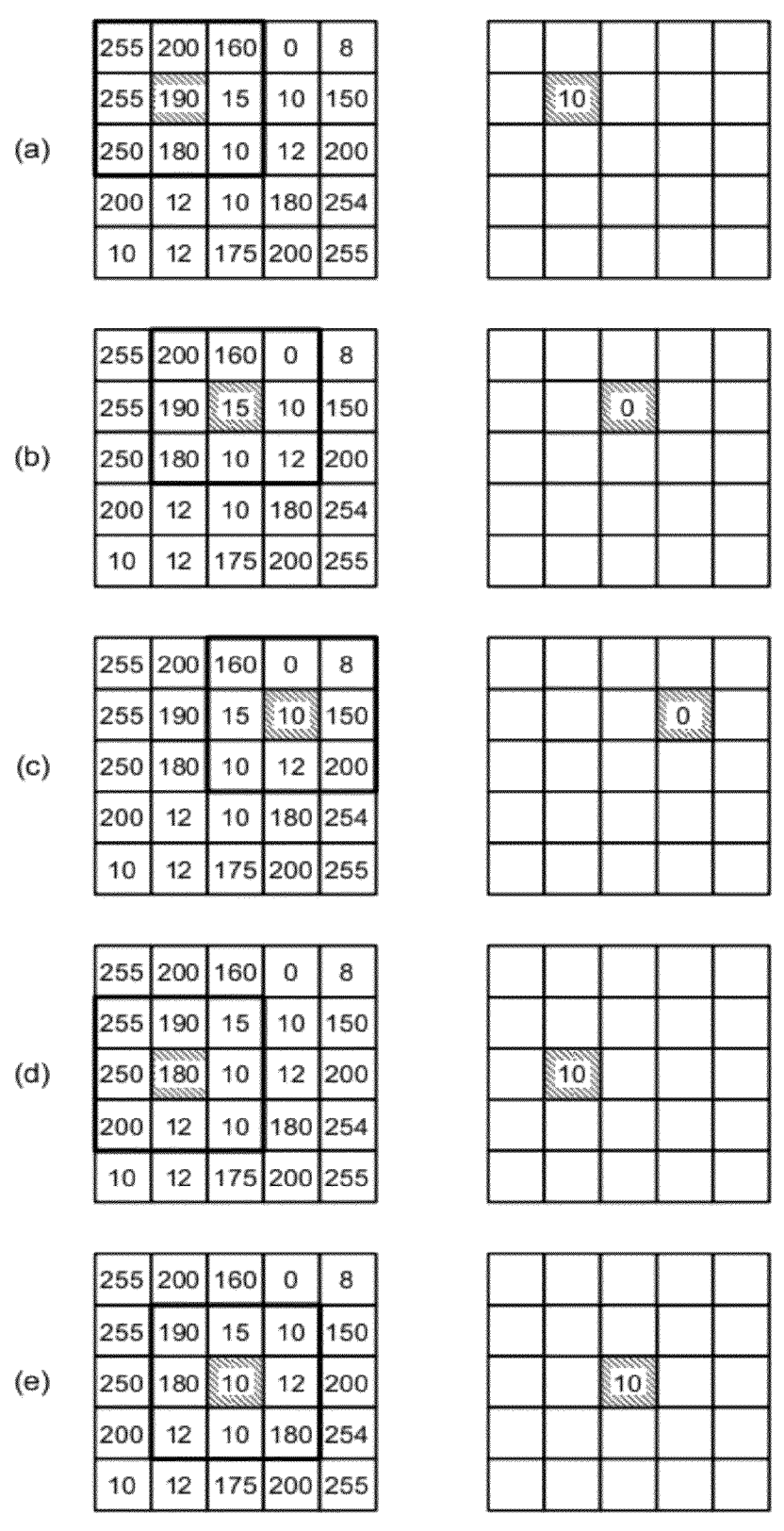

With reference to FIGS. 6 and 7, an exaggeration process with a grayscale image will be described more specifically. In FIGS. 6 and 7, each cell of five cells high by five cells wide represents a pixel (a dot). The pixel has a bit depth of eight bits, and the brightness is expressed by 256 shades of gray. The background color is set to white with a brightness value of 255.

In (a) of FIG. 6, an example of an image before the exaggeration process is illustrated. In this example, a black line with the line width of one to two pixels is drawn from top right to bottom left. On this image, an exaggeration process is performed in a manner described in the foregoing.

FIG. 7 illustrates a specific example of the exaggeration process. In FIG. 7, a pixel of interest is indicated by hatched lines in a cell. In (a) of FIG. 7, the second pixel from top and from left is the pixel of interest, and the brightness value of the pixel of interest is 190. As exemplified on the left side in (a) of FIG. 7, a value of 10 is the lowest brightness value out of the brightness values of the pixel of interest and eight pixels surrounding the pixel of interest. Accordingly, as exemplified on the right side in (a) of FIG. 7, the brightness value of the pixel of interest is set to 10.

Next, as exemplified on the left side in (b) of FIG. 7, with the pixel on the immediate right of the previous pixel of interest as a new pixel of interest, a similar process is carried out. In this case, a value of 0 is the lowest brightness value out of the brightness values of the pixel of interest and eight pixels surrounding the pixel of interest. Accordingly, as exemplified on the right side in (b) of FIG. 7, the brightness value of the pixel of interest is set to 0. Furthermore, as exemplified on the left side in (c) of FIG. 7, with the pixel on the immediate right of the previous pixel of interest as a new pixel of interest, a similar process is carried out. In this case, a value of 0 is the lowest brightness value out of the brightness values of the pixel of interest and eight pixels surrounding the pixel of interest. Accordingly, as exemplified on the right side in (c) of FIG. 7, the brightness value of the pixel of interest is set to 0.

In (d) and (e) of FIG. 7, the exaggeration process is carried out in a similar manner. In (d) of FIG. 7, the brightness value of the pixel of interest is set to 10, and in (e) of FIG. 7, the brightness value of the pixel of interest is set to 10.

In (b) of FIG. 6, illustrated is an example of the result of exaggeration processes carried out in sequence on all of the pixels in the image exemplified in (a) of FIG. 6 as a pixel of interest. In this case, the exaggeration process is carried out assuming that the areas outside the area of five pixels high by five pixels wide are all in the background color with the brightness value of 255. As exemplified in (b) of FIG. 6, the result of the exaggeration process appears as a black line the width of which is three to four pixels wide running from top right to bottom left of the image, and as compared with the state before the exaggeration process in (a) of FIG. 6, it can be seen that the line width of the black line is thickened and the drawn element of the image is expanded.

Figure 8:
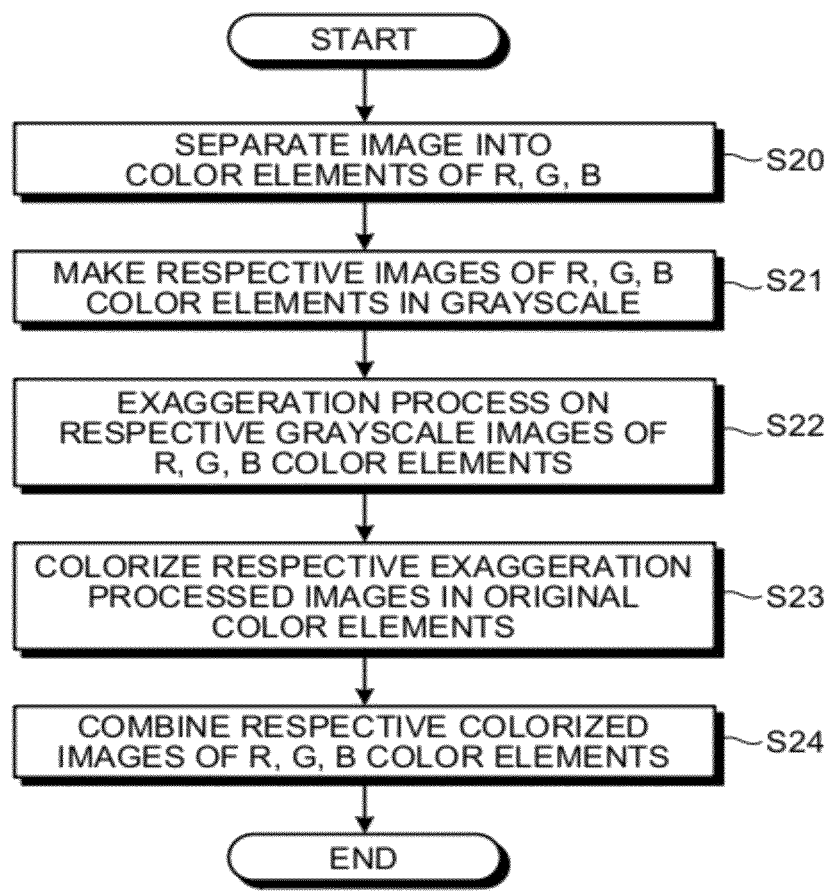
FIG. 8 is a flowchart for explaining an example of the exaggeration process performed on a color image.

For a color image, an exaggeration process is performed on the image for each of color elements of red (R), green (G), and blue (B), and the images of the respective color elements are then combined at the end. With reference to a flowchart in FIG. 8, an example of the exaggeration process for a color image will be described. At Step S20, a subject image is separated first into images of respective color elements of R, G, and B.

At the following Step S21, each of the images of the respective color elements of R, G, and B is made into grayscale. More specifically, the pixel values of the images of the respective color elements of R, G, and B formed at Step S20 are converted to brightness values. At the following Step S22, on each of the images of the respective color elements of R, G, and B in grayscale, an exaggeration process is performed in a manner described with reference to FIGS. 6 and 7.

In a color image, with a line of a given color, for example, the color R, the pixel value of the color R is at the maximum value and the pixel values of the other colors of the color B and the color G are at 0. Meanwhile, when the background color is white, more specifically, the pixel values of all colors of R, G, and B are of the maximum values, the pixel value of the color R is all at the maximum value even at the pixels other than the line in the color R. Therefore, the process to thicken the line width of the line of any one color element out of the colors of R, G, and B is synonymous with performing the above-described exaggeration process on the color element images of other than the subject color.

At the following Step S23, the images of the respective color elements of R, G, and B on which the exaggeration processes are performed at Step S22 are colorized in the original colors. More specifically, the brightness values of the images of the respective color elements of R, G, and B are converted to the pixel values of respective colors of R, G, and B. At the following Step S24, the colorized images of the respective color elements of R, G, and B are combined. As a consequence, the exaggeration process for the color image is carried out.

When the exaggeration process is carried out on a color image as described in the foregoing, at a boundary portion of colors before the exaggeration process, a color different from the colors on either side of the boundary may be caused. More specifically, in the above-described exaggeration process, the pixel value of a smaller value is prioritized in the images of the respective color elements of R, G, and B. Accordingly, at the boundary portion, a color darker than the colors on both sides of the boundary of the original, for example, black may be caused. However, in the first embodiment, as described later, because a reduction process is performed for the image after the exaggeration process, this point can be ignored.

Figure 9:
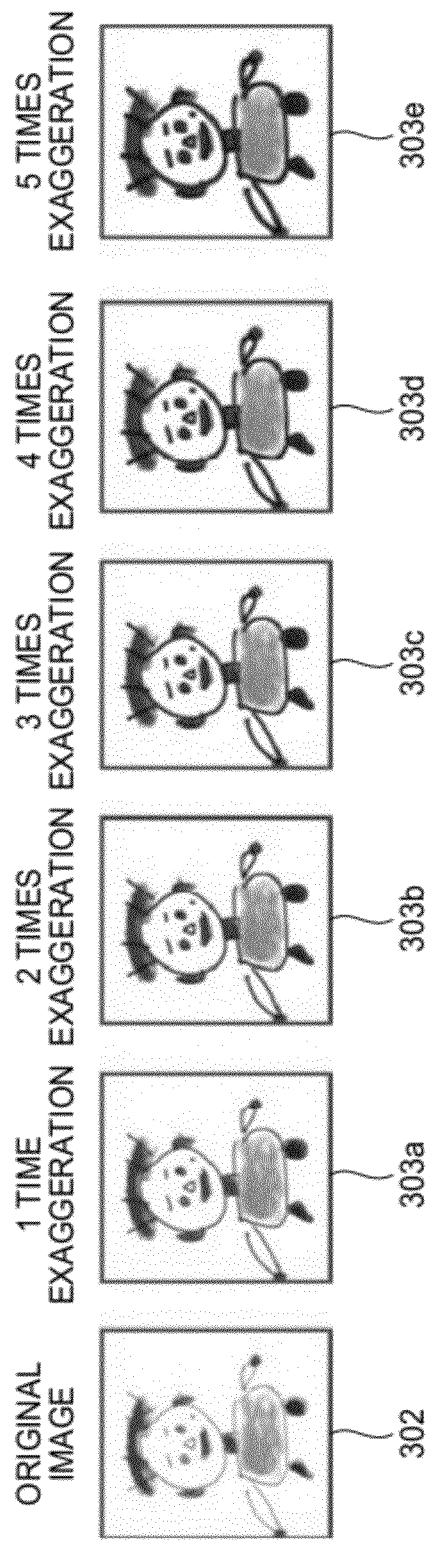
FIG. 9 illustrates the exaggeration processes to be carried out repeatedly.

Furthermore, the exaggeration process is executed repeatedly for the number of times that is included in the setting information read in at Step S11. More specifically, as exemplified in FIG. 9, the first exaggeration process is performed on an original image 302 before being exaggerated to obtain an exaggerated image 303a. The second exaggeration process is then performed on the resulting image 303a to obtain an image 303b in which the line widths of the drawing are thickly exaggerated than those in the image 303a. Images 303c, 303d, and 303e are examples of the images obtained in a similar manner by performing the third, the fourth, and the fifth exaggeration processes on the images of immediately before the exaggeration process. It can be seen that, as the number of exaggeration processes increases, the line widths of the drawn element become thicker.

Returning to the explanation of the flowchart in FIG. 3, when the exaggeration process for the number of processing times included in the setting information is finished at Step S13, the process goes to Step S14. At Step S14, the trimming processor 112 carries out a trimming process on the exaggerated image obtained at Step S13. Accordingly, the drawn element is trimmed from the image.

Figure 10:
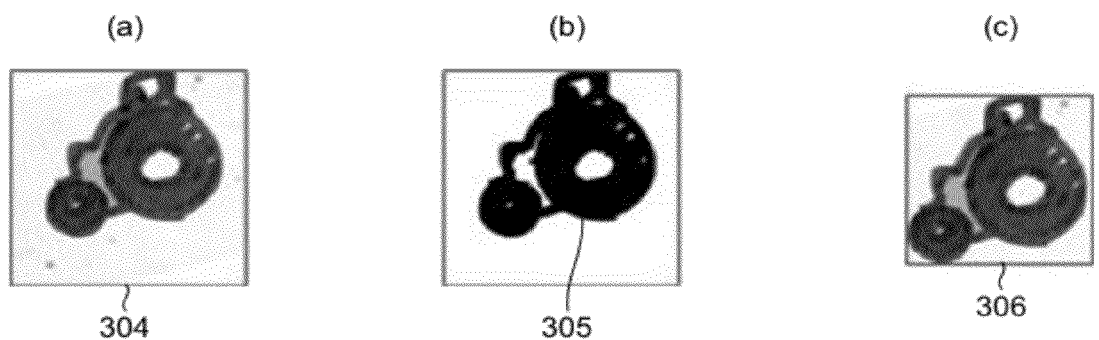
FIG. 10 illustrates a trimming process carried out by a trimming processor.

Referring to FIG. 10, the trimming process performed in the trimming processor 112 will be described. An image 304 before the trimming process is illustrated in (a) of FIG. 10. The trimming processor 112 generates a masking image 305 (see (b) of FIG. 10) that extracts the drawn element of the image 304. The masking image 305 is generated by threshold determining and binarizing the pixel value of each pixel in the image 304. The trimming processor 112 cuts out a smallest rectangle that includes the masking image 305 from the image 304. In (c) of FIG. 10, an image 306 that is the drawn element trimmed from the image 304 is illustrated.

While the trimming processor 112 is exemplified to trim a smallest rectangle including the masking image 305 from the image 304 to obtain the trimmed image 306 here, the trimming is not restricted to this example. For example, an area of the smallest rectangle including the masking image 305 added with some blank areas may be trimmed from the image 304 as the trimmed image 306.

Returning back to the explanation of the flowchart in FIG. 3, when the trimming process is finished at Step S14, at the following Step S15, the aspect ratio of the trimmed image 306 is made to 1:1 by the trimming processor 112. At Step S15, similarly to the above-described Step S12, blanks of an equal width are added to both top and bottom of or left and right of the trimmed image 306 to create a square-shaped image.

At the following Step S16, the reduction processor 113 performs a reduction process on the image the aspect ratio of which is made to 1:1 at Step S15 to generate a reduced image sufficiently small in size as compared with the image before the reduction process. The reduced image generated is output from the image processing apparatus 100 as a pictographic image. The reduction process performed by the reduction processor 113 can be carried out using a commonly-used image interpolation method such as a bilinear method and a bicubic method.

The reduction process will be described more specifically. As described in the foregoing, pictographic images are used, for example, in the cellular phone terminal 40 and the PC 41, being inserted to an e-mail document and such. For this reason, it is preferable to match the sizes of pictographic images with the font size typically used in an e-mail document as it makes the document easier to read. As an example, in the cellular phone terminal 40, for example, when the standard font size used in e-mail documents is 20 dots high by 20 dots wide, it is conceivable to make the size of pictographic images as 20 dots high by 20 dots wide to match the font size. The screen resolution of the cellular phone terminal 40 is generally considered to be, for example, approximately from 320 dots by 240 dots to 960 dots by 480 dots.

Figure 11:
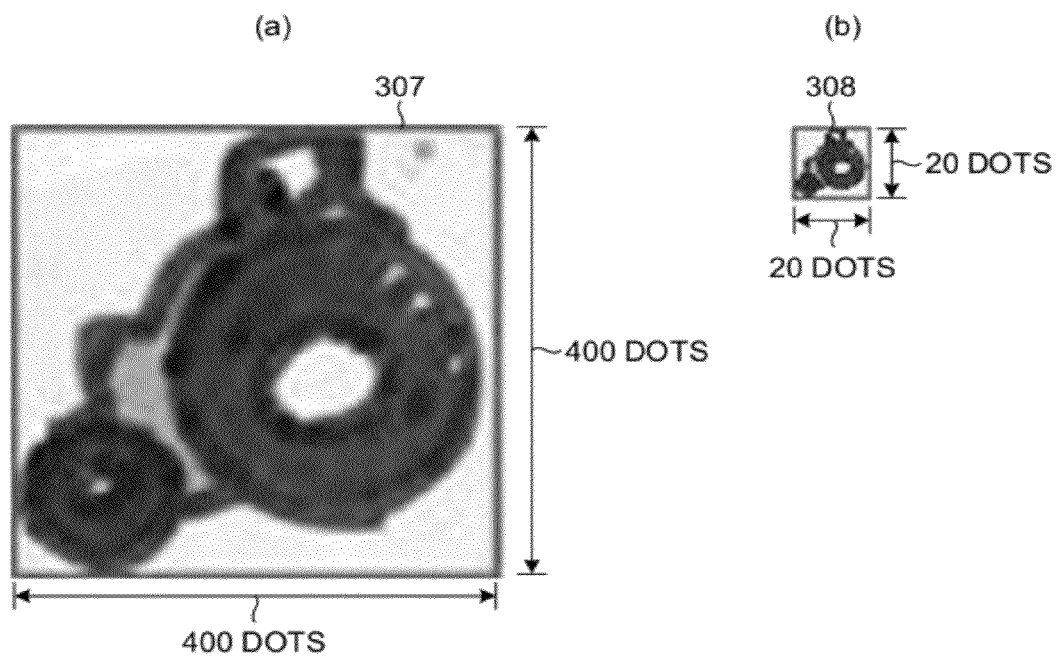
FIG. 11 illustrates a reduction process carried out by a reduction processor.

The reduction process will be explained with reference to FIG. 11. An image 307 whose resolution is normalized by the trimming processor 112 is illustrated. The size of the image 307 here is 400 dots high by 400 dots wide. The reduction processor 113 performs a reduction process on the image 307, and as exemplified in (b) of FIG. 11, generates a reduced image 308 sufficiently small in size with respect to the image 307 in a size of, for example, 20 dots high by 20 dots wide.

As described in the foregoing, the size of the reduced image 308 is selected corresponding to the standard font size used in e-mail documents in the cellular phone terminal 40. More specifically, the size of the reduced image 308 is not limited to 20 dots high by 20 dots wide, and is determined depending on the usage of a pictographic image by the reduced image 308, the specifications of a transmitting destination of the pictographic image, and the like, such as 16 dots high by 16 dots wide and 32 dots high by 32 dots wide. The reduction processor 113 may generate the reduced images 308 in a plurality of sizes.

The number of exaggeration processes at Step S13 in FIG. 3 is better to be determined in advance by executing the processes at Step S12 to Step S16 on one or a plurality of types of original images. The number of exaggeration processes at Step S13 is changed in sequence from zero to one time, two times, and so on to generate the respective reduced images 308. Then, the number of exaggeration processes that have generated the reduced image 308 determined optimal to the eye is included in the setting information in advance.

Figure 12:
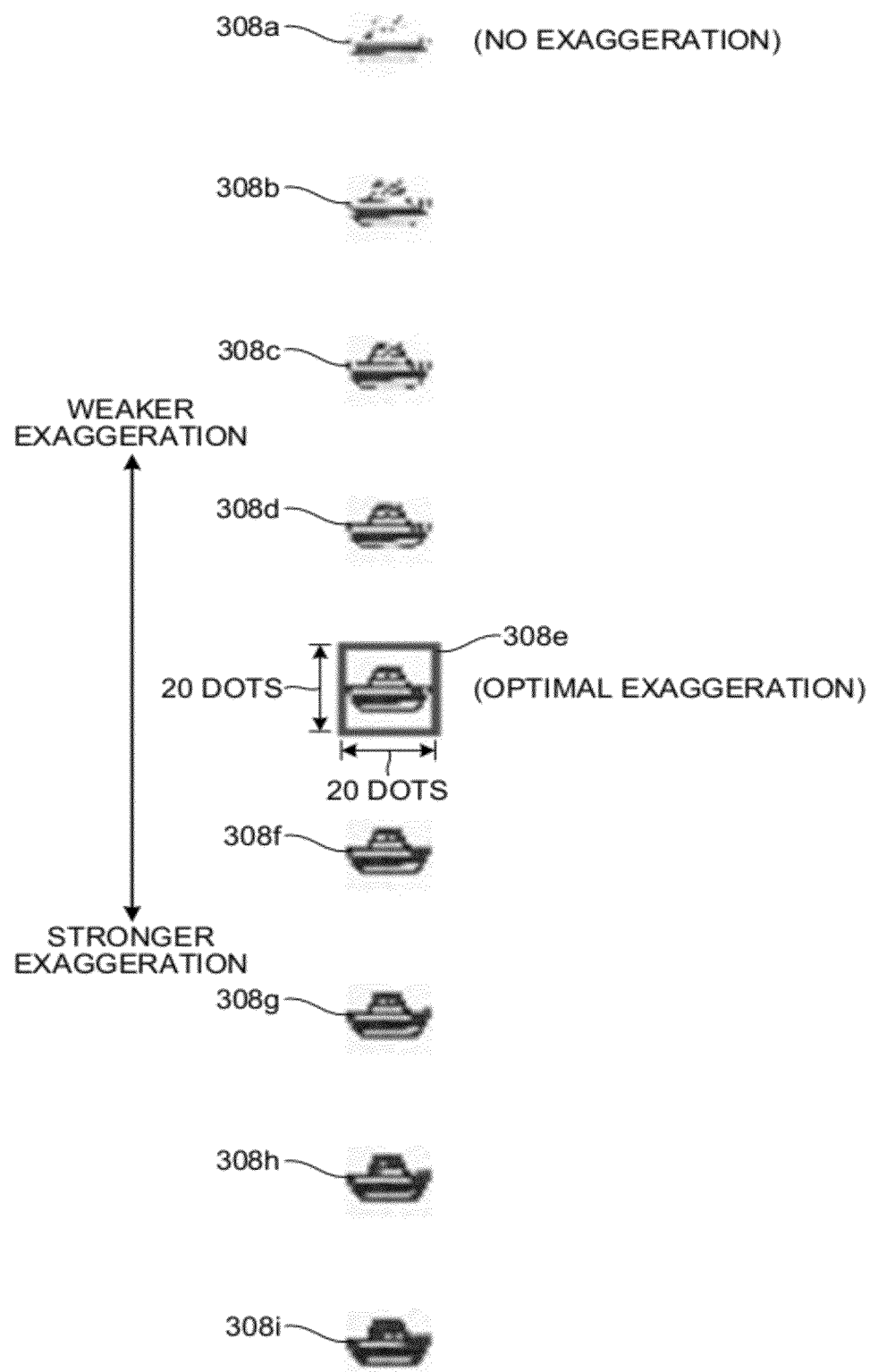
FIG. 12 illustrates how to determine the number of exaggeration processes.

Referring to FIG. 12, the method of determining the number of exaggeration processes will be schematically explained. In FIG. 12, a reduced image 308a is an example of the result of the reduction process when the exaggeration process is not carried out at Step S13, and reduced images 308b to 308i are examples of the results of the reduction process when the exaggeration process is carried out from one to eight times, respectively, at Step S13. The reduced images 308a to 308i are generated with the image illustrated in (a) of FIG. 5 as an original image.

As the number of exaggeration processes increases, the exaggeration becomes stronger, and with less number of processing times, the exaggeration becomes weak. When no exaggeration is made or the exaggeration is too weak, primary lines of the drawn element in the original image fade or a part of colors disappear, and thus, the shape of the original image in the reduced image is broken (for example, the reduced images 308a to 308c). On the other hand, when the exaggeration is too strong, the lines of the drawn element in the original image become too thick and color collapse and such are caused in the reduced image, and thus, the shape of the original image in the reduced image is broken (for example, the reduced images 308h and 308i).

The user or a provider of the image processing apparatus 100 (the image processing program) takes a look at the reduced images 308a to 308i generated by the exaggeration process carried out for the number of times different from one another, selects the reduced image that looks optimal, and then includes in the setting information the number of exaggeration processes at which time the reduced image selected is generated. In this example, the reduced image 308e is determined to be optimally exaggerated, and the number of exaggeration processes (four times) for the reduced image 308e is included in the setting information read in at Step S11.

While the number of exaggeration processes is exemplified to be included in the setting information in advance and to be read in at Step S11 in the foregoing, the number of exaggeration processes is not limited to this example. For example, the number of exaggeration processes can be input to the image processing apparatus 100 by the user when creating a pictographic image from an original image.

As in the foregoing, in the first embodiment, the reduction process is carried out after the exaggeration process for the drawn element is performed on an original image. Consequently, the primary lines of the drawn element in the original image can be prevented from fading or necessary colors can be prevented from disappearing, whereby an eye-friendly pictographic image that retains the shape of the drawn element as a whole can be generated.

First Modification in First Embodiment

Figure 13:
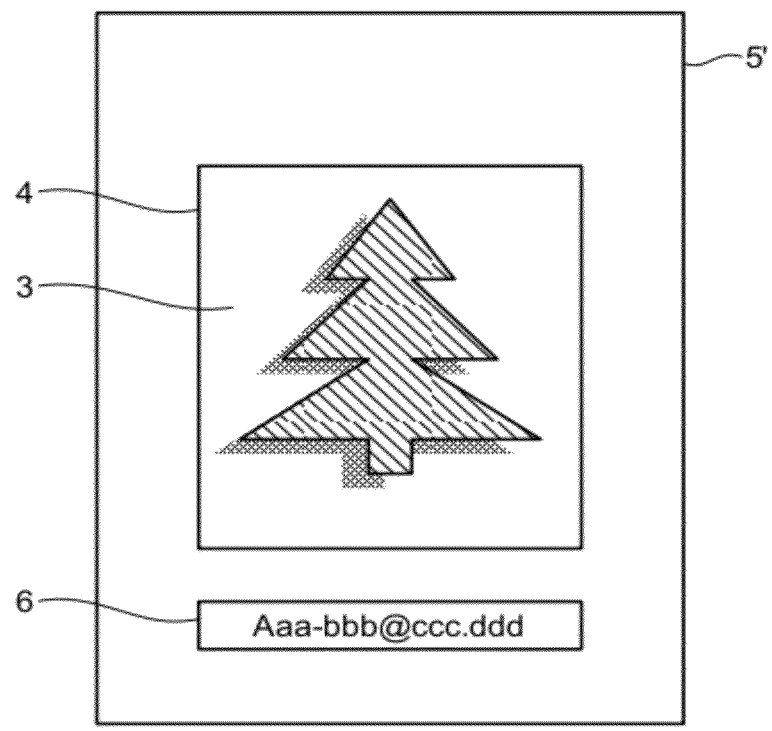
FIG. 13 is a diagram schematically illustrating an example of a form according to a first modification in the first embodiment.

While the form 5 used when extracting an original image from the drawing image data, which is the draft drawing 1 hand drawn by the user and read by the scanner 11, is exemplified to be printed with the frame 4 indicative of the drawing area 3 in the foregoing, the form is not limited to this example. FIG. 13 illustrates an example of a form 5' according to a first modification of the first embodiment. In FIG. 13, the portions common to those in FIG. 4 have the same reference numerals and their detailed explanations are omitted.

The form 5' according to the first modification of the first embodiment is further provided with an address entry area 6 where the address of a transmitting destination to transmit a pictographic image created from the design 2 drawn in the drawing area 3 is written. In the address entry area 6, for example, an e-mail address of the cellular phone terminal 40 or the PC 41 that is the transmitting destination of the pictographic image is written by the user in handwriting. The PC 10 extracts, from a drawing image obtained by the scanner 11 reading the draft drawing 1 written with the e-mail address, an image of the drawing area 3 and an image of the address entry area 6. The image of the drawing area 3 is processed as an original image, and a pictographic image is generated in the above-described manner.

The PC 10 performs an optical character recognition (OCR) process to the image of the address entry area 6 and extracts character information. The PC 10 then determines whether a character string composed of the character information extracted represents an e-mail address. For example, it is conceivable that, if a symbol @ (at sign) is included in a portion other than at the head or the tail end of a character string, the character string is determined as an e-mail address. The PC 10 transmits the pictographic image that is the processed image of the drawing area 3 to the e-mail address extracted from the address entry area 6 as a transmitting destination.

In accordance with the first modification, it is not necessary to input with keys an e-mail address of the transmitting destination of a pictographic image each time. Accordingly, the first modification is suitable to be used not only for the PC 10 but also when generating pictographic images using the MFP 20 or the like that has no dedicated character input unit such as a keyboard.

Second Modification in First Embodiment

Figure 14:
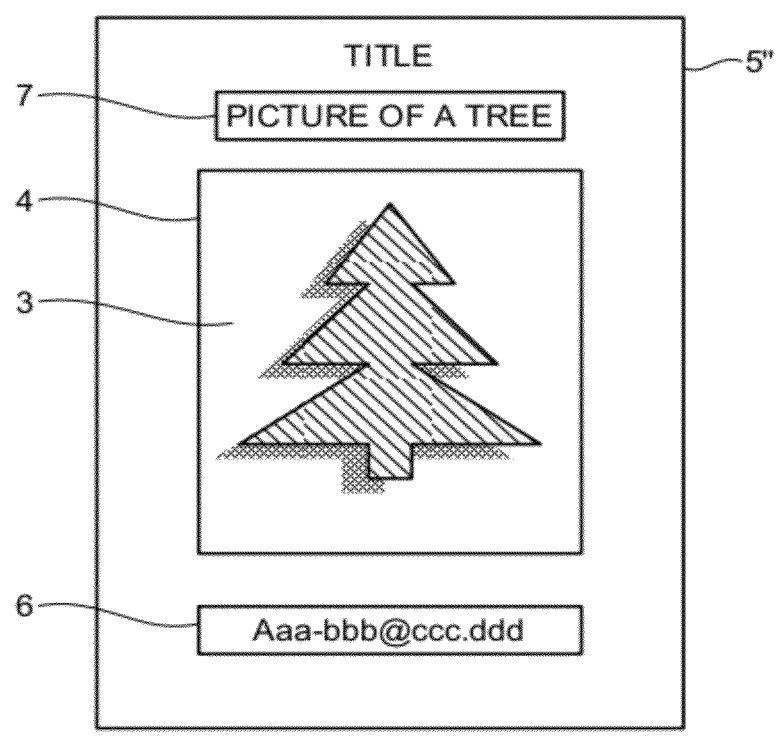
FIG. 14 is a diagram schematically illustrating an example of a form according to a second modification in the first embodiment.

FIG. 14 indicates an example of a form 5" according to a second modification of the first embodiment. In FIG. 14, the portions common to those in FIG. 13 described above have the same reference numerals, and their detailed explanations are omitted. The form 5" according to the second modification of the first embodiment is further provided with an additional information entry area 7 where additional information is entered, in addition to the above-described form 5' in the first modification. In the additional information entry area 7, for example, additional information concerning the design 2 drawn in the drawing area 3 is written by the user in handwriting. The additional information is conceivable to be, for example, a title of the design 2 drawn in the drawing area 3. However, the additional information is not limited to the title for the design 2, and the additional information may be, for example, a name of the user who drew the drawing in the drawing area 3 or the information that has no direct relevance to the design 2.

The PC 10 extracts, from a drawing image obtained by the scanner 11 reading the draft drawing 1 written with the additional information, an image of the drawing area 3, an image of the address entry area 6, and an image of the additional information entry area 7. The image of the drawing area 3 is processed as an original image. The image of the address entry area 6 is subjected to an OCR process as described above, and an e-mail address of a transmitting destination to transmit the pictographic image that is the processed image of the drawing area 3 is extracted. Furthermore, the image of the additional information entry area 7 is similarly subjected to an OCR process to extract character information, and a character string composed of the character information extracted is temporarily held in a memory and such as the additional information.

The PC 10 transmits the pictographic image that is the processed image of the drawing area 3 to the e-mail address extracted from the address entry area 6 as a transmitting destination. The PC 10 adds the additional information extracted from the additional information entry area 7 to the pictographic image to transmit to the transmitting destination.

In accordance with the second modification, the additional information concerning a pictographic image can be transmitted to a transmitting destination together with the pictographic image without entering it with keys each time. Consequently, the second modification is suitable to be used not only for the PC 10 but also when generating pictographic images using the MFP 20 or the like that has no dedicated character input unit such as a keyboard.

Second Embodiment

Next, a second embodiment of the invention will be described. In the above-described first embodiment, a pictographic image is generated as a still image. In contrast, in the second embodiment, a pictographic image is generated as a moving image. The moving image is generated from a single original image. For example, the moving image generated in the second embodiment is composed of rotation, move, and enlargement/reduction, and a combination of the foregoing.

Figure 15:
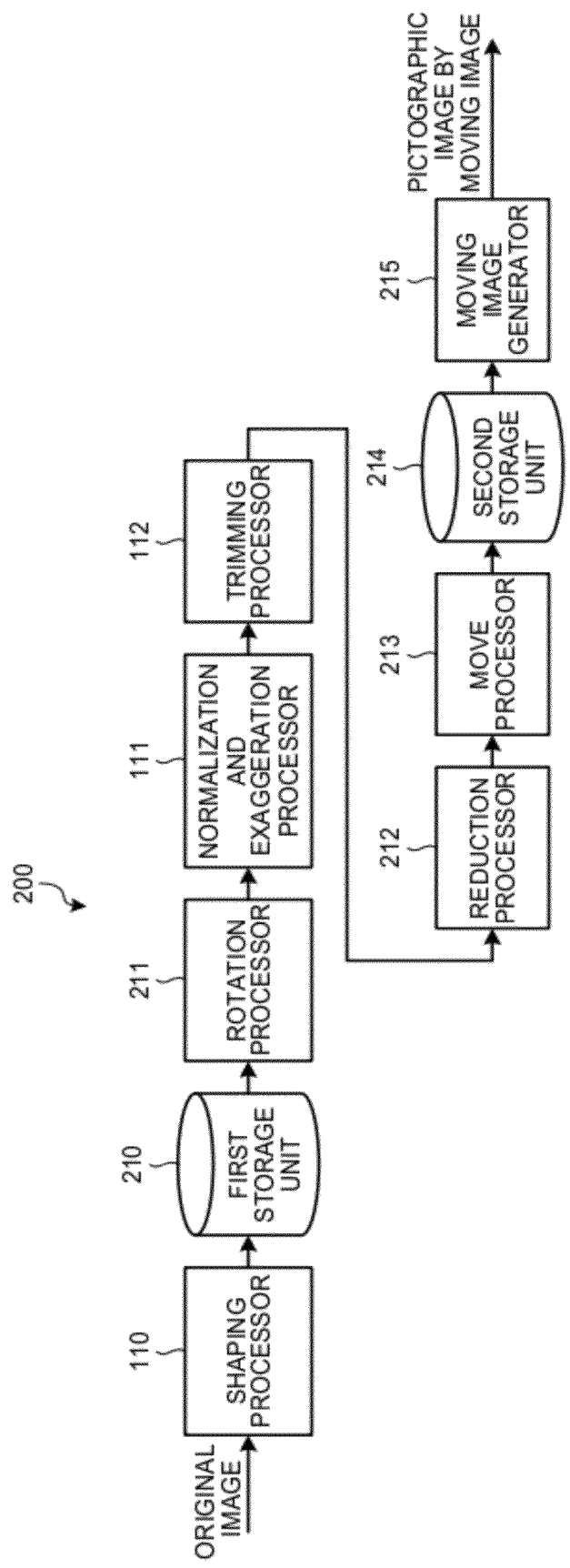
FIG. 15 is a functional block diagram illustrating an example of functions of an image processing apparatus according to a second embodiment.

FIG. 15 is a functional block diagram illustrating an example of functions of an image processing apparatus 200 according to the second embodiment. In FIG. 15, the portions common to those in FIG. 2 described above have the same reference numerals, and their explanations in detail are omitted. The image processing apparatus 200 includes the shaping processor 110, a first storage unit 210, a rotation processor 211, the normalization and exaggeration processor 111, the trimming processor 112, a reduction processor 212, a move processor 213, a second storage unit 214, and a moving image generator 215.

In FIG. 15, the first storage unit 210 stores therein an image that is an original image shaped to have an aspect ratio of 1:1 by the shaping processor 110. The rotation processor 211 reads out the shaped image from the first storage unit 210 and rotates the image read out by an angle specified. The normalization and exaggeration processor 111 performs on the rotation image generated by the rotation processor 211 the normalization of resolution as described in the first embodiment and then performs an exaggeration process.

The trimming processor 112 trims a necessary portion from the image rotated by the rotation processor 211 and exaggerated by the normalization and exaggeration processor 111, and shapes the image trimmed to have an aspect ratio of 1:1. The reduction processor 212 performs a reduction process on the image created by the trimming processor 112 to reduce the image into a specified size. The move processor 213 performs a move process on the image reduced by the reduction processor 212 to move in a direction and by the amount of move specified. The image output from the move processor 213 is stored in the second storage unit 214.

In the image processing apparatus 200, the respective processes by the rotation processor 211, the normalization and exaggeration processor 111, the trimming processor 112, the reduction processor 212, and the move processor 213 are repeated on the image read out from the first storage unit 210 for the number of times specified. Furthermore, in the second storage unit 214, an image created in each repetition is stored in a cumulative manner. When the processes for the specified number of times are finished, the moving image generator 215 reads out the images of the respective rounds of processes from the second storage unit 214 and arranges the images in chronological order to generate a pictographic image by moving images.

Figure 16:
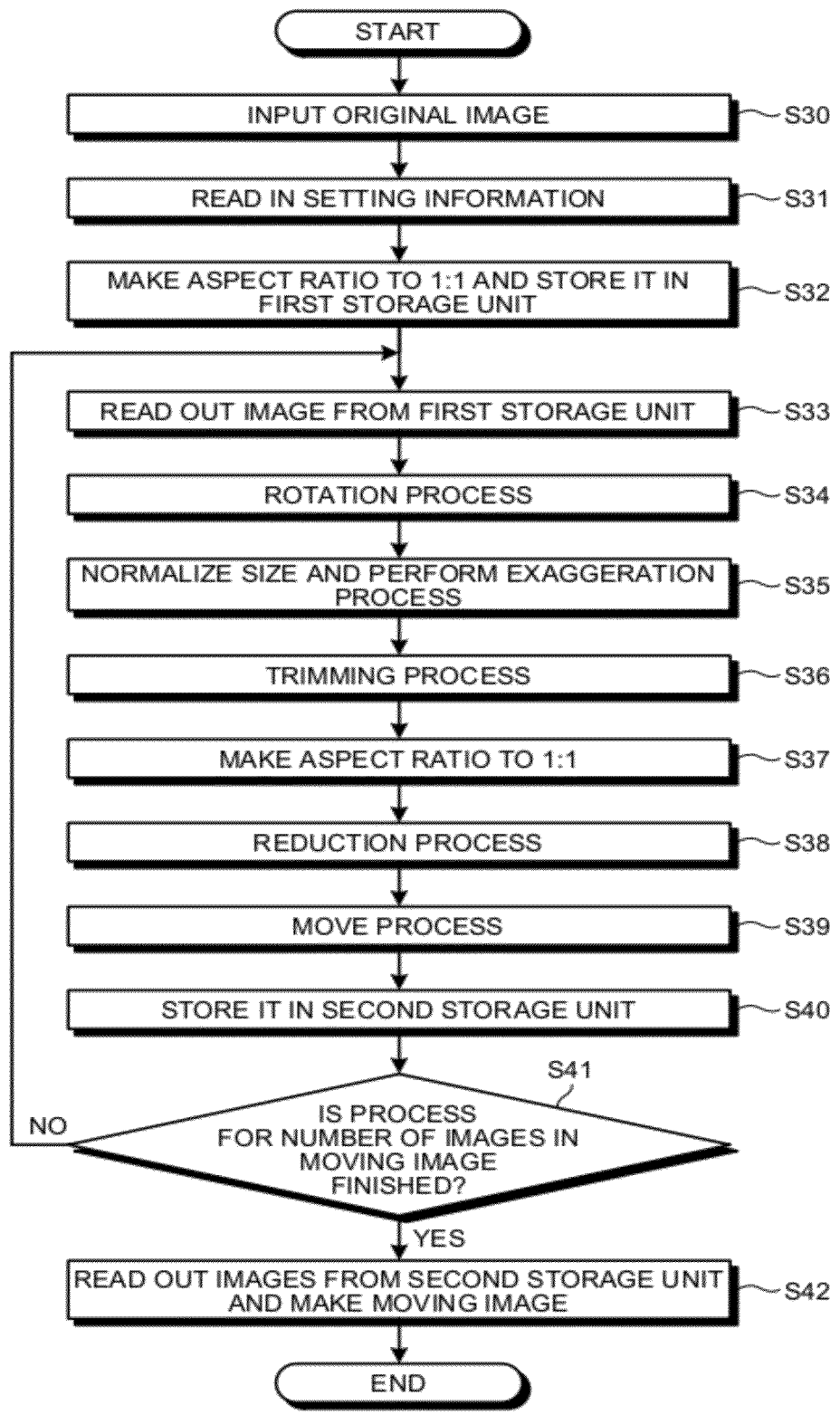
FIG. 16 is a flowchart illustrating an example of a pictographic image generating method in the second embodiment.

FIG. 16 is a flowchart illustrating an example of a pictographic image generating method according to the second embodiment. A pictographic image here is generated using the PC 10 and the scanner 11 illustrated in FIG. 1. In this case, the respective units constituting the image processing apparatus 200 are loaded into the main memory of the PC 10 as modules of the image processing program installed in the PC 10.

Prior to the execution of the flowchart in FIG. 16, the user prepares the draft drawing 1 drawn on paper with the design 2 desired to make a pictographic image using a marker pen and the like. The user then inputs drawing image data of the draft drawing 1 read by the scanner 11 to the PC 10. In the PC 10, a predetermined area including the drawn element with the design 2 is extracted from the drawing image data as an original image.

In the flowchart in FIG. 16, at Step S30, the original image is input to the image processing apparatus 200. The original image received is transmitted to the shaping processor 110. At the following Step S31, by a CPU (not depicted) that controls, for example, the whole image processing apparatus 200, setting information is read in.

FIG. 17 illustrates an example of the setting information. An example format of the setting information is illustrated in (a) of FIG. 17. On the first line of the setting information, the number of images constituting a moving image (unit: frame) and display time per image in the moving image (unit: 1/100 second) are indicated.

On the second line of the setting information, the information set for each of the images constituting the moving image is indicated. In this example, as the information set for each image, the number of exaggeration times, rotation angle (unit: degree), size, amount of move in the x direction (unit: dot), and amount of move in the y direction (unit: dot) are indicated. Among the foregoing, the number of exaggeration times is selected from a range of, for example, 0 to 30 times. The size is selected from a range of, for example, 1 dot by 1 dot to 30 dots by 30 dots in a square shape. The rotation angle is an angle with respect to, for example, the x direction of the original image. The amount of move in the x direction and the amount of move in the y direction are with respect to the image at an initial position that has undergone no move process. The information on the second line of the setting information is described for the number of images constituting the moving image.

In (b) of FIG. 17, illustrated is an example of content of a setting information file in which the setting information is stored. As illustrated, the setting information is stored in the file with each of the items being set off by a comma (,) and each line being set off by a line feed character (not depicted). In the example in (b) of FIG. 17, the first line describes that the moving image is constituted by four images, and the display time for one image is 0.5 seconds. The second and subsequent lines describe the setting information for the respective images constituting the moving image. For example, the second line represents for the first image constituting the moving image indicating that the number of exaggeration times is seven times, the rotation angle is five degrees, the size is 20 dots high by 20 dots wide, and there is no move in the x direction and in the y direction. The third to the fifth lines similarly describe the setting information for the respective images.

In the flowchart in FIG. 16, when the setting information is read in at Step S31, the process goes to the following Step S32. At Step S32, in the shaping processor 110, blanks of an equal width are added to both top and bottom of or left and right of the original image supplied to form an image in a square shape the aspect ratio of which is 1:1. The image shaped by the shaping processor 110 is stored in the first storage unit 210.

At the following Step S33, the rotation processor 211 reads out the image from the first storage unit 210. In a loop process from this Step S33 to a later described Step S41, the processes in each loop are performed on the same image read out from the first storage unit 210. At that time, in each loop, the setting information on the respective lines from the second line of the setting information (see (b) of FIG. 17) is applied to the image subject to the process for each loop in sequence.

At the following Step S34, the rotation processor 211 performs a rotation process that rotates the image read out from the first storage unit 210 by an angle indicated at the item of the rotation angle in the setting information. The center of rotation is set, for example, at a central part of the image. As an example, a rotation process of 15 degrees (counterclockwise direction) is performed on an image illustrated in (a) of FIG. 18 to obtain a rotated image illustrated in (b) of FIG. 18. The rotation process of an image can be realized using a known rotation matrix.

At the following Step S35, similarly to the above-described Step S13 in FIG. 3, the normalization and exaggeration processor 111 normalizes the resolution of the image created at Step S34 and then performs an exaggeration process for the number of times indicated at the item of the number of exaggeration times in the setting information. At the following Step S36, similarly to the above-described Step S14 in FIG. 3, the trimming processor 112 carries out a trimming process on the image exaggerated at Step S35 and trims a smallest rectangle that includes the drawn element from the exaggerated image. The smallest rectangle may be trimmed with some blank areas being added. At the following Step S37, by the trimming processor 112, the aspect ratio of the trimmed image is made to 1:1 to create an image in a square shape.

Next, at Step S38, the reduction processor 212 performs on an image output from the trimming processor 112 a reduction process according to the information indicative of the size of image included in the setting information. In the setting information, making the information indicative of the size of image to a different value for each line, more specifically, for the respective images constituting the moving image allows creating a moving image in which the design 2 in a pictographic image is enlarged or reduced.

Figure 19:
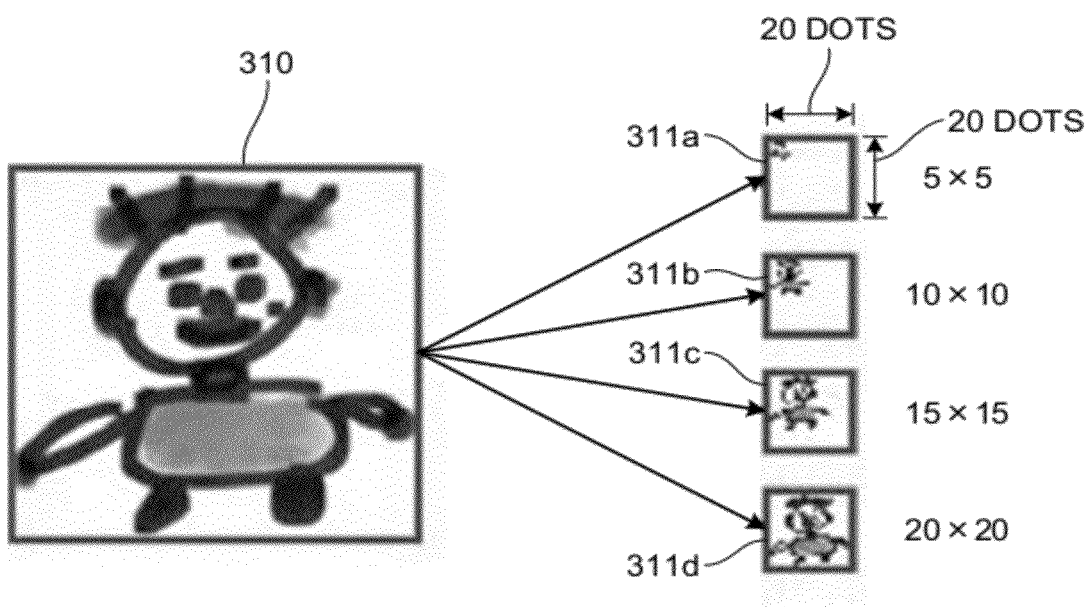
FIG. 19 illustrates a moving image concerning enlargement and reduction.

With reference to FIG. 19, a moving image concerning enlargement/reduction will be explained. As an example, a moving image is constituted by four images, and the size of a pictographic image finally output is 20 dots high by 20 dots wide. In the setting information, the size of image for the first to the fourth image constituting the moving image is set as 5, 10, 15, and 20, respectively.

In this case, at the first loop, the size of an image 310 is reduced to five dots high by five dots wide. The image reduced to five dots high by five dots wide is arranged at a given position within a frame of 20 dots high by 20 dots wide to generate a reduced image 311a. The position arranged for the reduced image may be a position specified in advance or the information indicative of the arranged position may be added in the setting information.

In the second and subsequent loops, the process is performed in a similar manner. More specifically, in the second loop, the image 310 is reduced to 10 dots high by 10 dots wide and arranged at a given position in the frame of 20 dots high by 20 dots wide to generate a reduced image 311b. In the third and the fourth loops, the image 310 is reduced to 15 dots high by 15 dots wide and 20 dots high by 20 dots wide, respectively, and arranged at given positions in the frame of 20 dots high by 20 dots wide to generate respective reduced images 311c and 311d.

Displaying the reduced images 311a to 311d generated in the order of the reduced images 311a, 311b, 311c, and 311d allows representing a situation of the design 2 in the pictographic image being expanded gradually. Likewise, displaying the reduced images in the order of the reduced images 311d, 311c, 311b, and 311a allows representing a situation of the design 2 in the pictographic image being reduced gradually.

The image 310 can be reduced in a size larger than the size specified for the pictographic image finally output. In this case, a process of trimming the image after the reduction by the size specified for the pictographic image is carried out.

When the reduction process at Step S38 is finished, the process goes to Step S39. At Step S39, the move processor 213 performs a move process on the reduced image according to the amount of move in the x direction and the amount of move in the y direction included in the setting information. The move is performed with respect to the point at the upper left corner of the reduced image as an origin. In the setting information, making a value of at least one of the information indicative of the amount of move in the x direction and the information indicative of the amount of move in the y direction different for each line, more specifically, for each image constituting the moving image allows creating a moving image in which the design 2 in the pictographic image moves.

Figure 20:
FIG. 20 illustrates an example of a move process more specifically.

Referring to FIG. 20, an example of the move process will be described more specifically. The amount of each move in the x direction and in the y direction is assumed to be set as −5. The move processor 213 holds in a memory and such, for example, a reduced image 312a that is a reduced image before the move at a first loop, in other words, the reduced image that has undergone no move process. The move process is carried out, for example, by reading out the reduced image 312a held in the memory, and by moving each pixel of the reduced image 312a read out: in units of dot according to the amount of move in the x direction and the amount of move in the y direction.

In (a) of FIG. 20, each pixel of the reduced image 312a is moved by −5 in the x direction (five dots leftwards) and by −5 in the y direction (five dots upwards) with the point at the upper left corner of the reduced image 312a as an origin. The pixels that fall outside the range of the original reduced image 312a by the move are discarded. Consequently, a reduced image 312b that is the reduced image 312a moved −5 dots in the x direction (five dots leftward) and −5 dots in the y direction (five dots upward) is obtained.

When the move process on the reduced image is performed at Step S39, the process goes to Step S40 and the reduced image on which the move process is performed is stored in the second storage unit 214.

At the following Step S41, it is determined whether the process for the number of images constituting the moving image in the setting information is finished. If the process is not finished, the process is returned to Step S33, and the normalized original image stored in the first storage unit 210 is read out, and the process is executed on the normalized original image read out.

On the other hand, at Step S41, if the process for the number of images constituting the moving image is finished, the process goes to Step S42. At Step S42, a moving image generating process by the moving image generator 215 is performed. More specifically, the moving image generator 215 reads out a plurality of reduced images stored in the second storage unit 214. The moving image generator 215 then arranges and links the reduced images read out in chronological order according to the display time per image included in the setting information to generate a single moving image file.

As one of the formats for such moving image files in which a moving image is constituted by a plurality of linked images, graphics interchange format (GIF) is known. In GIF, for a single file, storing predetermined header information followed by a plurality of pairs of image control information including the information of duration time (display time) and image data that is the body of the image displayed makes it possible to display a moving image. Furthermore, to the header information, the information indicative of the number of loops for the moving image can be added as extension information.

The moving image generated by the moving image generator 215 is output from the image processing apparatus 200 as a pictographic image by the moving image.

Figure 21:
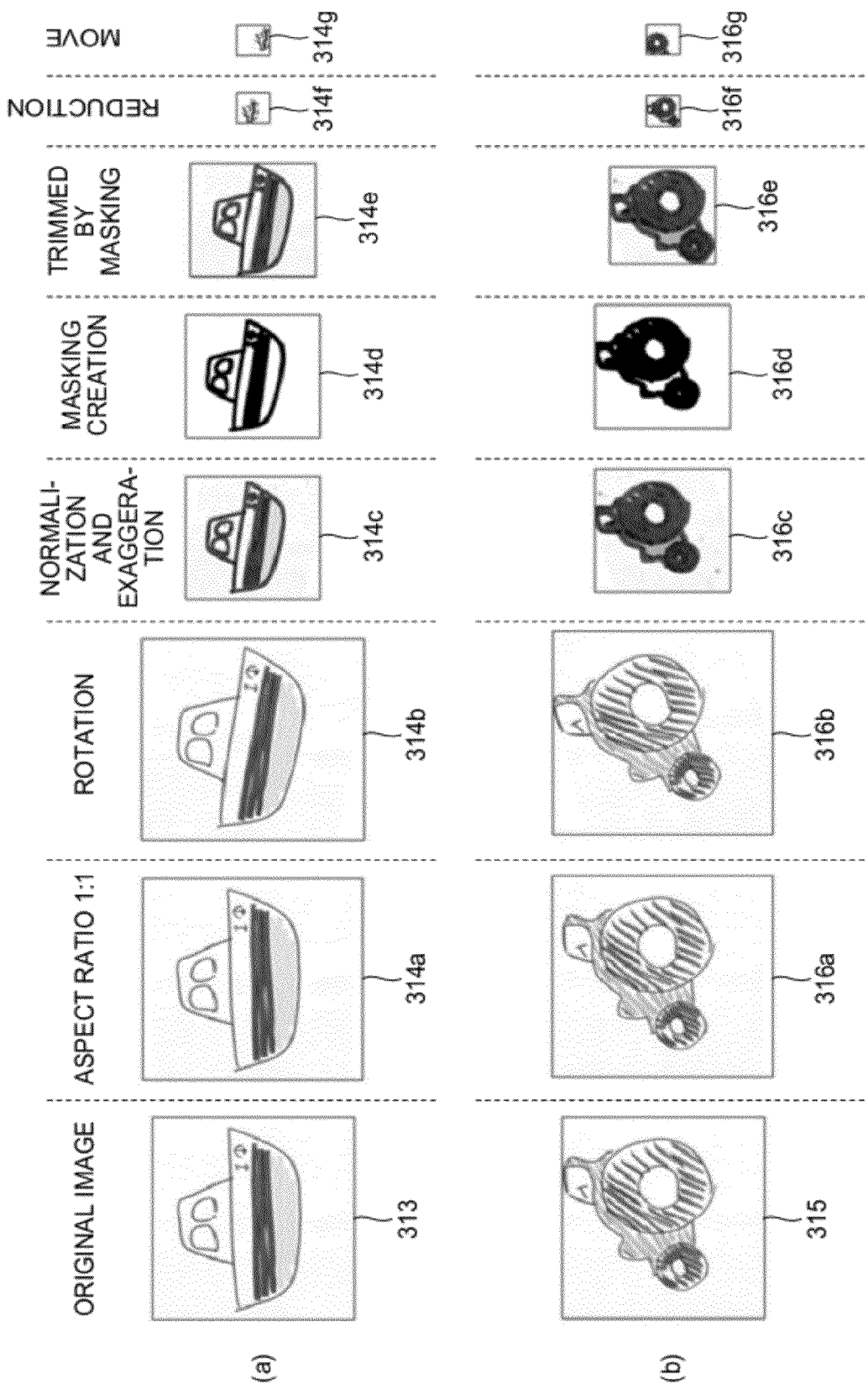
FIG. 21 illustrates pictographic image generating processes for a moving image in the second embodiment.

Referring to FIG. 21, a pictographic image generating process by a moving image by the above-described flowchart in FIG. 16 will be described in summary. In (a) of FIG. 21, illustrated is an example of, when generating a moving image pictographic image of 20 dots high by 20 dots wide, the setting information being set that the rotation angle is −15 degrees, the number of exaggeration times is five times, the size is 16 dots high by 16 dots wide, and the amount of move is three in the x direction and eight in the y direction. In (b) of FIG. 21, illustrated is an example of, when similarly generating a moving image pictographic image of 20 dots high by 20 dots wide, the setting information being set that the rotation angle is 15 degrees, the number of exaggeration times is eight times, the size is 20 dots high by 20 dots wide, and the amount of move is −5 in the x direction and −5 in the y direction.

In the example in (a) of FIG. 21, at Step S30 in FIG. 16, an original image 313 in which the design 2 desired to make a pictographic image is drawn is input, and at Step S31, the setting information corresponding to the original image 313 is read in. At the following Step S32, an image 314a that is the original image 313 shaped to have an aspect ratio of 1:1 by the shaping processor 110 is created. By making the original image 313 have the aspect ratio of 1:1, the drawn element can be prevented from being dropped out when a rotation process is performed at Step S34. The image 314a is stored in the first storage unit 210.

Next, the rotation processor 211 reads out the image 314a from the first storage unit 210 (Step S33) and performs a rotation process of −10 degrees (clockwise direction) on the image 314a according to the setting information to generate an image 314b. At the following Step S35, after the normalization of resolution is performed on the image 314b to make the degree of exaggeration by a single exaggeration process constant, the exaggeration process is performed for the number of exaggeration times according to the setting information (five times) to generate an image 314c.

When the exaggeration process is performed, subsequently, at Step S36, a masking image 314d is generated based on the image 314c in the trimming processor 112. By the masking image 314d, an image including the drawn element of the design 2 desired to make a pictographic image is trimmed from the image 314c. At Step S37, the trimming processor 112 performs a shaping process that makes the cutout image have an aspect ratio of 1:1 to obtain an image 314e in a square shape.

Next, in the reduction processor 212, the image 314e is reduced to the size of 16 dots high by 16 dots wide according to the setting information (Step S38), and the reduced image is arranged within a frame of 20 dots high by 20 dots wide to obtain a reduced image 314f. Furthermore, by the move processor 213, the move process of three dots in the x direction and eight dots in the y direction according to the setting information is performed on the reduced image 314f (Step S39) to obtain a moved image 314g.

The process for the example in (b) of FIG. 21 is approximately the same as that in (a) of FIG. 21 described above. An original image 315 is input at Step S30 in FIG. 16, and at Step S31, the setting information corresponding to the original image 315 is read in. At the following Step S32, an image 316a that is the original image 315 shaped to have an aspect ratio of 1:1 is created, and the image 316a is stored in the first storage unit 210. The rotation processor 211 performs a rotation process of 15 degrees (counterclockwise direction) according to the setting information on the image 316a read out from the first storage unit 210 at Step S33 to generate an image 316b. At the following Step S35, the normalization of resolution is performed on the image 316b and then the exaggeration process is performed on the resulting image for the number of exaggeration times according to the setting information (eight times) to generate an image 316c.

When the exaggeration process is performed, subsequently, at Step S36, by a masking image 316d generated based on the image 316c in the trimming processor 112, an image including the drawn element of the design 2 desired to make a pictographic image is trimmed from the image 314c. The trimming processor 112 then performs a shaping process that makes the cutout image have an aspect ratio of 1:1 to obtain an image 316e in a square shape.

Next, in the reduction processor 212, the image 316e is reduced to the size of 20 dots high by 20 dots wide according to the setting information (Step S38) to obtain a reduced image 316f. Furthermore, by the move processor 213, the move process of −5 dots in the x direction and −5 dots in the y direction according to the setting information is performed on the reduced image 316f (Step S39) to obtain an image 316g.

In the second embodiment, varieties of moving images can be generated from a single original image by combining a plurality of processes. For example, in the move process, by appropriately setting in the setting information the amount of move in the x direction and in the y direction for each of the images constituting a moving image, the drawn element in a reduced image can be moved up and down, left and right, and diagonally, and in a combination of the foregoing (in a zigzag manner and such). Furthermore, in the rotation process, by appropriately setting the rotation angle in the setting information, the drawn element in the reduced image can be set to rotate in either the clockwise direction or counterclockwise direction. Moreover, by appropriately setting the size of the image in the setting information, the drawn element in the reduced image can be enlarged or reduced. Furthermore, more complex moves can be realized from a single original image easily by combining these move process, rotation process, and enlarging and reducing process.

Figure 22:
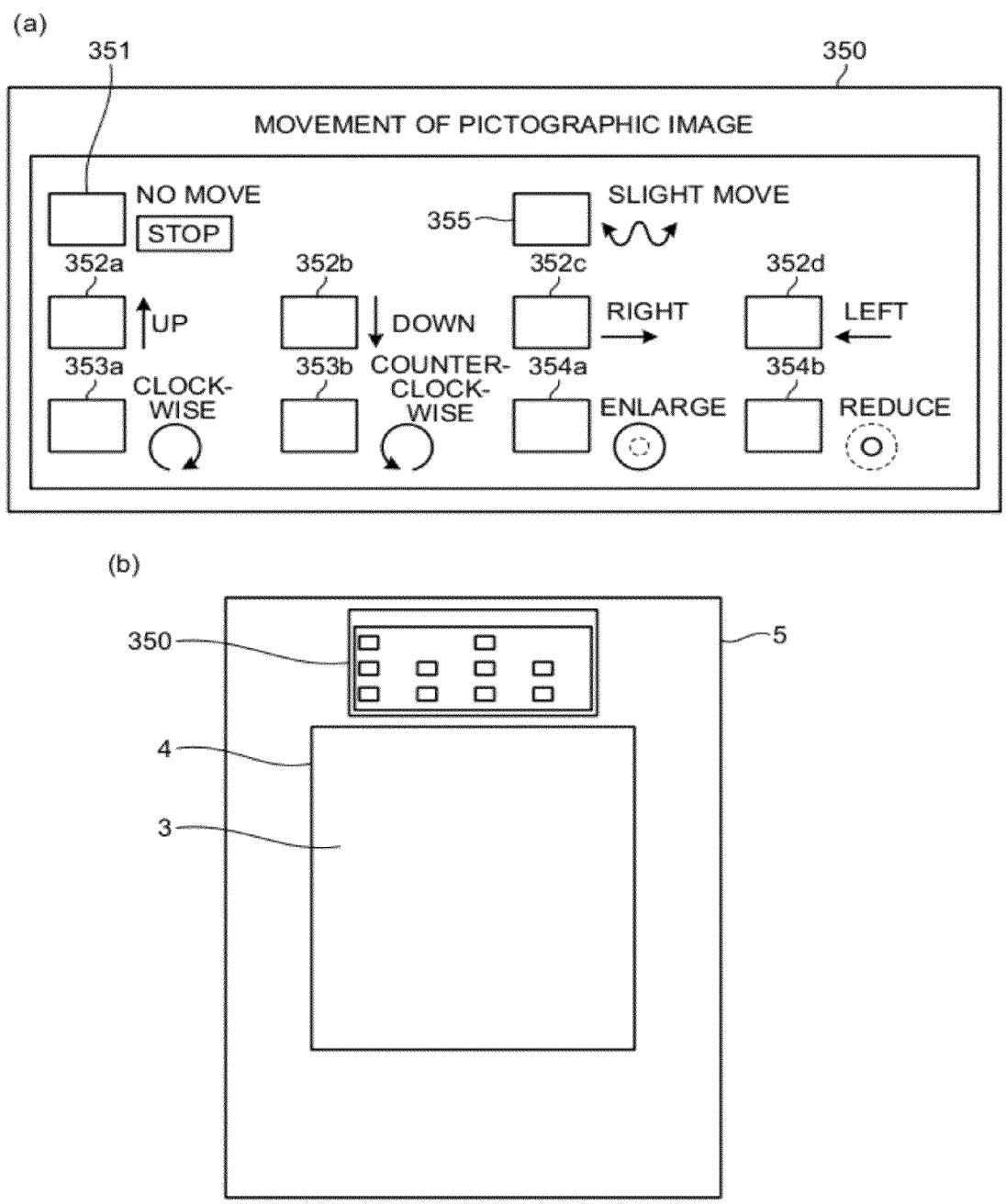
FIG. 22 illustrates an example of a setup entry area where the movement of a pictographic image for the moving image is set.

In (a) of FIG. 22, illustrated is an example of a setup entry area 350 for setting the movement of a pictographic image by a moving image. The setup entry area 350 is provided, for example, as illustrated in (b) of FIG. 22, being printed on the form 5 in advance. In this example, the setup entry area 350 is provided with a plurality of checkboxes 351 to 355 for setting the movement.

The user puts checks in the checkboxes 351 to 355 with a marker pen and such to set various settings. The PC 10 extracts an image of the setup entry area 350 from a drawing image that is the image of the draft drawing 1 including the setup entry area 350 read by the scanner 11, and detects the positions checked with the marker pen and such. The PC 10 then generates setting information according to the setting items corresponding to the positions detected.

The checkbox 351 sets that the pictographic image is not moved. When this checkbox 351 is checked, for example, generation of a pictographic image by the image processing apparatus 100 according to the first embodiment is carried out. The display time in the setting information may be set to infinite and the number of images constituting moving image may be set to one image. The checkboxes 352a to 352d set the movement in the upward direction, the downward direction, the rightward direction, and the leftward direction, respectively. The checkboxes 353a and 353b set the rotation movement in the clockwise direction and the counterclockwise direction, respectively. The checkboxes 354a and 354b set movements of enlargement and reduction, respectively. The checkbox 355 sets a predetermined small movement. With these checkboxes 351 to 355, for example, a plurality of items that are not contradictory to one another can be set at the same time.

While the setup entry area 350 is exemplified to be printed on the form 5, it is not restricted to this example. For example, the setup entry area 350 can be presented as a setup entry screen displayed on a display unit in a device such as the PC 10 and the MFP 20 constituting the image processing apparatus 200. The user puts checks in the checkboxes 351 to 355 according to the setup entry screen displayed on the display unit of the PC 10 or the MFP 20 by operating a pointing device such as a mouse, a touch panel, or various keys. The PC 10 or the MFP 20 generates setting information based on the content checked.

Rotation Process in Second Embodiment

Next, some processes specific to the second embodiment when performing a rotation process in creating a moving image will be explained. The first process concerns the procedure of a rotation process in an overall process. In the second embodiment, as illustrated in the above-described flowchart in FIG. 16, the rotation process by the rotation processor 211 is executed before the reduction process by the reduction processor 212. Accordingly, bleeding or collapse of an image by the rotation process can be prevented.

An explanation will be made with reference to FIG. 23. In the following, explained will be a situation of generating, from an original image 317 of, for example, about 400 dots high by 400 dots wide, a reduced image of 20 dots high by 20 dots wide with the design 2 drawn in the original image 317 being rotated by 15 degrees in the counterclockwise direction.

Figure 23:
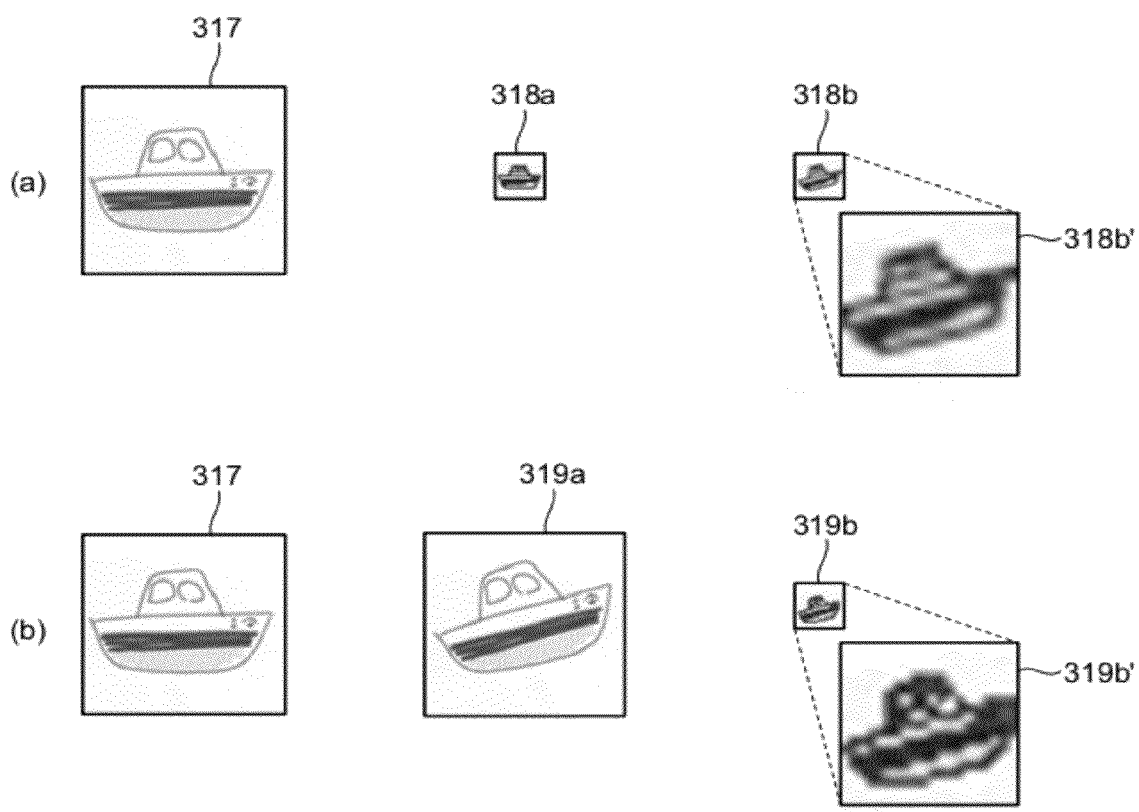
FIG. 23 illustrates the difference in reduced images by the rotation processes of different procedures.

In (a) of FIG. 23, an example of rotating an image after the image is reduced is illustrated. After performing an exaggeration process, a trimming process, a normalization process, and such on the original image 317, the image is reduced using image interpolation to generate an image 318a. A rotation process is performed on the image 318a to obtain an image 318b in which the design 2 is rotated. An image 318b' is a magnified image of the image 318b for easier viewing. Because the rotation process is applied after the original image 317 is reduced and thus the resolution is lowered, the image 318b looks like largely bleeding as compared with the original image 317.

On the other hand, (b) of FIG. 23 illustrates an example of reducing an image after the image is rotated. The original image 317 is rotated to obtain an image 319a. Then, after performing an exaggeration process, a trimming process, a normalization process, and such on the image 319a, the image is reduced using image interpolation to generate an image 319b. An image 319b' is a magnified image of the image 319b for easier viewing. In this case, the rotation process is performed while the resolution is sufficiently high, and then the reduction process is carried out after the exaggeration process and such. Consequently, as compared with the above-described image 318b in which the rotation process is performed after the reduction process is performed, the image 319b has less bleeding and such and is much easier to see.

The second process is adjustment of intensity in the exaggeration process corresponding to the angle of rotation. In the second embodiment, when the rotation process is carried out by the rotation processor 211, the degree of the exaggeration process in the normalization and exaggeration processor 111 is changed corresponding to the rotation angle.

An explanation will be made with reference to FIG. 24. On an original image 320 illustrated in (a) of FIG. 24, a rotation process of a specified angle is performed, and after an exaggeration process is performed on the rotation-processed image for a given number of times, a reduction process is performed to obtain a reduced image of, for example, 20 dots high by 20 dots wide. The resolution of the original image 320 is, for example, about 400 dots high by 400 dots wide.

In (b) of FIG. 24, illustrated are respective examples of when rotation processes and exaggeration processes are carried out on the original image 320 with rotation angles of 0 degrees, 15 degrees, 30 degrees, 45 degrees, 60 degrees, 75 degrees, and 90 degrees, and reduction processes are further performed. The optimal number of exaggeration processes with no rotation process performed is assumed to be seven times in this example. In (b) of FIG. 24, indicated are the examples in which the number of exaggeration processes performed is seven times and that of nine times.

As can be seen from the examples in (b) of FIG. 24, at the rotation angles of 15 degrees, 30 degrees, 60 degrees, and 75 degrees, as compared with the reduced image with the rotation angle of 0 degrees, some roughness is visible in diagonal lines. In contrast, the reduced image with the rotation angle of 90 degrees has no discernible difference in appearance to the reduced image with the rotation angle of 0 degrees. Furthermore, with the reduced image with the rotation angle of 45 degrees, there is not much discernible difference in appearance to the reduced image with the rotation angle of 0 degrees.

Meanwhile, with the examples in which the number of exaggeration processes performed is nine times in (b) of FIG. 24, it can be seen that, for the reduced images with the rotation angles of 15 degrees, 30 degrees, 60 degrees, and 75 degrees, as compared with the examples in which the number of exaggeration processes performed is seven times, there is an improvement in appearance. In (c) of FIG. 24, illustrated is in close-up, with the rotation angle of 15 degrees, a reduced image 321a in which the number of exaggeration processes performed is seven times and a reduced image 321b in which the number of exaggeration processes performed is nine times. On the contrary, with the reduced images with the rotation angle of 45 degrees, it can be seen that increasing the number of exaggeration processes to nine times made lines too thick, thereby making it rather hard to see.

In this example, when the rotation angles are C degrees, 45 degrees, and 90 degrees, the number of exaggeration processes is set to seven times as is. When the rotation angles are 15 degrees, 30 degrees, 60 degrees, and 75 degrees, the number of exaggeration processes is increased to nine times to enhance the degree of exaggeration as compared to when the rotation angle is at 0 degrees, 45 degrees, and 90 degrees. By changing the number of exaggeration processes depending on the rotation angle to change the degree of exaggeration in this manner, the appearance of reduced images in rotation in the moving image where the reduced images rotate can be prevented from being changed significantly.

As described in the foregoing, in accordance with the second embodiment, the exaggeration process is carried out after the rotation process is performed on an original image, and then the reduction process is carried out to generate a pictographic image by a moving image. Consequently, a pictographic image by a moving image that is easier to see when reproduced can be generated. Furthermore, in accordance with the second embodiment, a moving image with various movements can be easily created from a single original image.

PC Configuration

Figure 25:
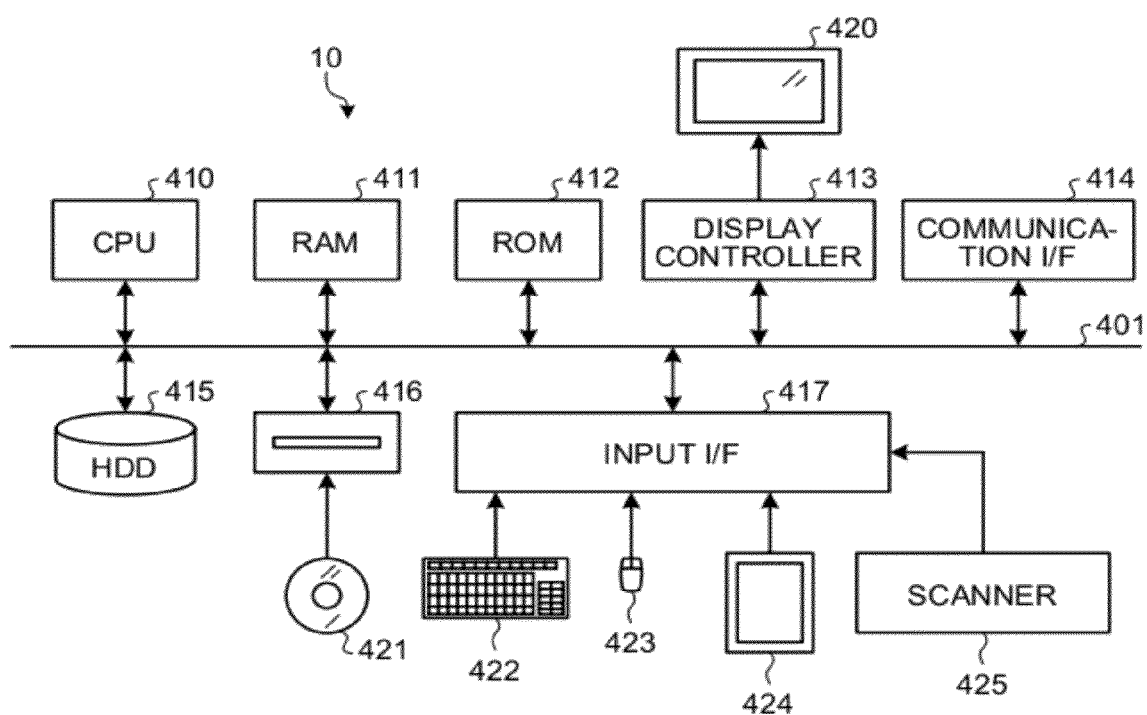
FIG. 25 is a schematic block diagram illustrating an example of a configuration of a PC applicable to the image processing apparatuses in the first and the second embodiments in common.

FIG. 25 illustrates an example of a configuration of the PC 10 that is commonly applicable to the image processing apparatus 100 in the first embodiment and the image processing apparatus 200 in the second embodiment described in the foregoing.

In FIG. 25, with respect to a bus 401, a CPU 410, a RAM 411, a ROM 412, a display controller 413, and a communication interface (I/F) 414 are connected. With respect to the bus 400, a hard disk drive (HDD) 415, a drive device 416, and an input I/F 417 are further connected. The RAM 411 and the HDD 415 can be applied for the first storage unit 210 and the second storage unit 214 in the image processing apparatus 200 illustrated in FIG. 15.

The CPU 410 controls, in accordance with a program stored in the ROM 412 or the HDD 415, the operation of the computer using the RAM 411 as a work memory. The display controller 413 converts a display control signal generated by the CPU 410 into a signal displayable on a display device 420 and outputs the signal.

The HDD 415 stores therein programs executed by the CPU 410, data used by the programs, and such. The drive device 416 can be loaded with a detachable recording medium 421, and can read data from or write data to the recording medium 421. As for the recording medium 421 supported by the drive device 416, a disc recording medium such as a compact disc (CD), a digital versatile disc (DVD), and a flexible disc, or a semiconductor memory that is rewritable and non-volatile can be conceived.

The input I/F 417 receives data input from the outside. For example, the input I/F 417 has a given interface such as a universal serial bus (USB) and Institute of Electrical and Electronics Engineers (IEEE) 1394, and by the interface, receives data input from external devices such as a tablet 424 and a scanner 425. The input I/F 417 is further connected with input devices such as a keyboard 422 and a mouse 423. The user can give instructions to the computer, for example, by operating these input devices in response to displays on the display device 420.

The communication I/F 414 performs communication with an external communication network using a given protocol.

The image processing program to realize the image processing apparatus 100 and the image processing apparatus 200 on the PC 10 is provided in a file of an installable format or an executable format stored in a computer readable recording medium of, for example, a CD, a DVD, a flexible disc, and a non-volatile memory such as a USB memory.

The image processing program may be stored on a computer connected to a network such as the Internet and configured to be provided by downloading it via the network. The image processing program may further be configured to be provided or distributed via a network such as the Internet. The image processing program may further be configured to be provided being embedded in a ROM and such in advance.

The image processing program is modularly configured, for example, in the first embodiment, to include the respective units in the foregoing (the shaping processor 110, the normalization and exaggeration processor 111, the trimming processor 112, and the reduction processor 113). As for the actual hardware, the CPU 410 reads out the image processing program from the above-described recording medium and executes it to load the respective units into a main memory (RAM 411), whereby the shaping processor 110, the normalization and exaggeration processor 111, the trimming processor 112, and the reduction processor 113 are generated on the main memory.

Third Embodiment

Next, a third embodiment of the invention will be described. In the third embodiment, a first communication is performed with a cellular phone terminal to obtain a transmitting destination address to transmit a pictographic image to the cellular phone terminal. According to the transmitting destination address obtained, a second communication is then performed to transmit the pictographic image to the cellular phone terminal.

The first communication here is a communication that allows communicating even when a party obtaining the transmitting destination address has no unique information of the other party in advance. A contactless near-field communication system adopted for Osaifu-Keitai (registered trademark), which means a mobile wallet, and such can be applied as a system for the first communication. In this communication system, the electromagnetic induction of an antenna for conducting wireless communication supplies power to an IC chip to make wireless communication in a non-contacting manner. In accordance with the near-field communication system, by placing a cellular phone terminal embedded with an IC chip that supports the communication system close to a dedicated reader/writer in a non-contacting manner, the communication between the IC chip and the reader/writer is started automatically.

Figure 26A:
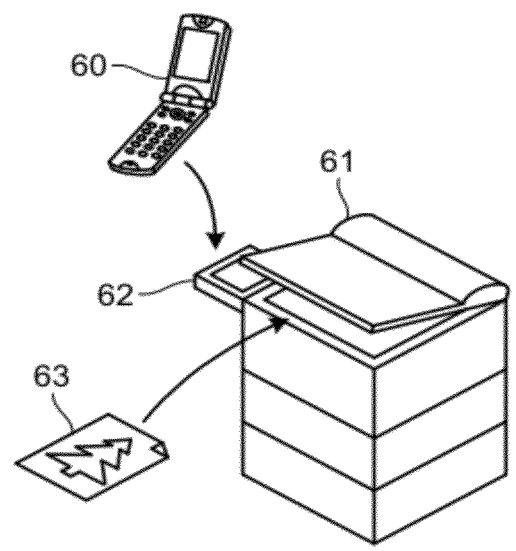
FIG. 26A is a diagram schematically illustrating an example of a configuration of a pictographic image creating system that uses a contactless near-field communication system according to a third embodiment.
Figure 26B:
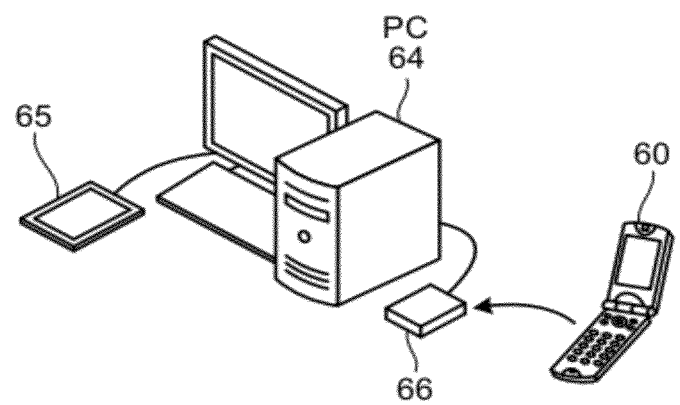
FIG. 26B is a diagram schematically illustrating another example of a configuration of a pictographic image creating system that uses a contactless near-field communication system according to the third embodiment.

FIGS. 26A and 26B illustrate examples of a configuration of a pictographic image creating system using the contactless near-field communication system. FIG. 26A is an example in which, using an MFP 61, a pictographic image is generated based on a drawing 63 drawn with the design 2 desired to make the pictographic image, and is transmitted to a cellular phone terminal 60 of a user. The cellular phone terminal 60 here is embedded with an IC chip (not depicted) that supports a contactless near-field communication system, and the MFP 61 is connected with a reader/writer 62 that communicates in the communication system. The MFP 61 further has a pictographic image generating function in the first embodiment or the second embodiment and has a function to transmit data to a transmitting destination specified by an e-mail address.

The user draws the design 2 desired to make a pictographic image on a form to create the drawing 63. The user then makes the MFP 61 scan the drawing 63 using a scanner function. The MFP 61 extracts an original image including the drawn element of the design 2 desired to make a pictographic image from a drawing image that is the drawing 63 being read, and the MFP 61 generates a pictographic image of, for example, 20 dots high by 20 dots wide based on the original image extracted similarly to the above-described first embodiment or the second embodiment.

The user brings the cellular phone terminal 60, which is the transmitting destination of the pictographic image generated, close to the reader/writer 62 connected to the MFP 61. This makes a wireless communication start between the IC chip in the cellular phone terminal 60 and the reader/writer 62. By this communication, the MFP 61 can obtain an e-mail address of the cellular phone terminal 60. The MFP 61 then transmits the pictographic image generated based on the drawing image that is the drawing 63 being read to the e-mail address obtained by this communication as a transmitting destination.

FIG. 26B is an example in which, using a PC 64, the design 2 desired to make a pictographic image is drawn with a pointing device such as a pen tablet 65 and an original image for the pictographic image is directly taken in to the PC 64. The PC 64 is connected with a reader/writer 66 and has a pictographic image generating function in the first embodiment or the second embodiment. The PC 64 further has a function to transmit data to a transmitting destination specified by an e-mail address.

The user draws the design 2 desired to make a pictographic image using the pen tablet 65. The PC 64 generates an original image that includes the drawn element of the design 2 according to the drawing with the pen tablet 65, and generates a pictographic image of, for example, 20 dots high by 20 dots wide based on the original image similarly to the first embodiment or the second embodiment.

The user then brings the cellular phone terminal 60, which is the transmitting destination of the pictographic image generated, close to the reader/writer 66 connected to the PC 64. This makes a wireless communication start between the IC chip in the cellular phone terminal 60 and the reader/writer 66. By this communication, the PC 64 can obtain an e-mail address of the cellular phone terminal 60. The PC 64 then transmits the pictographic image generated based on the drawing 2 drawn with the pen tablet 65 to the e-mail address obtained by this communication as a transmitting destination.

As described in the foregoing, in accordance with the third embodiment, the user draws the design 2 desired to make a pictographic image using a marker pen or the pen tablet 65 and inputs the design 2 to the MFP 61 or the PC 64, and simply holds out the cellular phone terminal 60 that is the transmitting destination of the pictographic image towards the reader/writer 62 (66). This allows the user to use a self-made pictographic image on the cellular phone terminal 60.

The embodiments described above provide an effect of reducing visibility degradation in a reduced image the size of which is reduced from that of an original image to fit in a display size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    rotation circuitry configured to rotate an original image including a hand-drawn element;
    exaggeration circuitry configured to perform, on the hand-drawn element of the original image having an angle of rotation, an exaggeration process that thickens a line width of a drawn line in the hand-drawn element to generate an exaggerated image, with a degree of thickening corresponding to the angle of rotation; and
    reduction circuitry configured to reduce the exaggerated image to generate a reduced image of a predetermined size smaller than a size of the original image.

2. The image processing apparatus according to claim 1, further comprising:
    moving image generating circuitry configured to arrange a plurality of reduced images generated by the reduction circuitry in chronological order to generate a moving image, wherein
    the moving image generating circuitry generates the moving image from the reduced images that are generated by the reduction circuitry from a plurality of exaggerated images, the exaggerated images being generated by the exaggeration circuitry through the exaggeration process that thickens a line width of a drawn line in rotated images with degrees of thickening corresponding to different angles, the rotated images being generated by rotations of the different angles, respectively, by the rotation circuitry.

3. The image processing apparatus according to claim 1, further comprising:
    reading circuitry configured to read a drawing image to generate drawing image data;
    extracting circuitry configured to extract from the drawing image data the original image and destination information indicative of a destination to which the reduced image generated from the original image is transmitted; and
    transmitting circuitry configured to transmit the reduced image generated from the extracted original image to the destination indicated by the destination information.

4. The image processing apparatus according to claim 1, further comprising:
    acquiring circuitry configured to perform communication with a portable terminal to acquire destination information indicative of a destination used to transmit the reduced image to the portable terminal; and
    transmitting circuitry configured to transmit the reduced image to the destination indicated by the destination information acquired by the acquiring circuitry.

5. The image processing apparatus according to claim 3, wherein:
    the extracting circuitry further extracts additional information for the original image from the drawing image data, and
    the transmitting circuitry transmits the reduced image generated from the original image extracted from the drawing image data and the extracted additional information for the original image to the destination indicated by the destination information extracted from the drawing image data.

6. An image processing method comprising:
    rotating an original image including a hand-drawn element;
    performing, by a processor on the hand-drawn element of the original image having an angle of rotation, an exaggeration process that thickens a line width of a drawn line in the hand-drawn element to generate an exaggerated image, with a degree of thickening corresponding to the angle of rotation; and
    reducing the exaggerated image to generate a reduced image of a predetermined size smaller than a size of the original image.

7. The image processing method according to claim 6, further comprising:
    generating a moving image from a plurality of reduced images generated from a plurality of exaggerated images at the reducing, the reduced images being arranged in chronological order, the exaggerated images being generated through the exaggeration process that thickens a line width of a drawn line in rotated images with degrees of thickening corresponding to different angles, the rotated images being generated by rotations of the different angles, respectively, at the rotating.

8. The image processing method according to claim 6, further comprising:
    reading a drawing image to generate drawing image data;
    extracting from the drawing image data the original image and destination information indicative of a destination to which the reduced image generated from the original image is transmitted; and
    transmitting the reduced image generated from the extracted original image to the destination indicated by the destination information.

9. The image processing method according to claim 6, further comprising:
    performing communication with a portable terminal to acquire destination information indicative of a destination used to transmit the reduced image to the portable terminal; and transmitting the reduced image to the destination indicated by the destination information.

10. The image processing method according to claim 8, further comprising:
extracting additional information for the original image from the drawing image data, wherein
the transmitting includes transmitting the reduced image generated from the original image extracted from the drawing image data and the extracted additional information for the original image to the destination indicated by the destination information extracted from the drawing image data.

11. A non-transitory computer-readable recording medium with an executable program stored thereon, wherein the program instructs a computer to perform:
rotating an original image including a hand-drawn element;
performing on the hand-drawn element of the original image having an angle of rotation an exaggeration process that thickens a line width of a drawn line in the hand-drawn element to generate an exaggerated image, with a degree of thickening corresponding to the angle of rotation; and
reducing the exaggerated image to generate a reduced image of a predetermined size smaller than a size of the original image.

12. The medium according to claim 11, wherein the exaggeration process sets a pixel value of a pixel of interest of the drawn line of the hand-drawn element to a lowest pixel value among the pixel of interest and neighboring pixels that surround the pixel of interest.

13. The medium according to claim 11, wherein the exaggeration process sets, for each pixel of pixels of the drawn line of the hand-drawn element, a pixel value to a lowest pixel value among the pixel and neighboring pixels that surround the pixel.

14. The image processing method according to claim 6, wherein the exaggeration process sets a pixel value of a pixel of interest of the drawn line of the hand-drawn element to a lowest pixel value among the pixel of interest and neighboring pixels that surround the pixel of interest.

15. The image processing method according to claim 6, wherein the exaggeration process sets, for each pixel of pixels of the drawn line of the hand-drawn element, a pixel value to a lowest pixel value among the pixel and neighboring pixels that surround the pixel.

16. The image processing apparatus according to claim 1, wherein the exaggeration process sets a pixel value of a pixel of interest of the drawn line of the hand-drawn element to a lowest pixel value among the pixel of interest and neighboring pixels that surround the pixel of interest.

17. The image processing apparatus according to claim 1, wherein the exaggeration process sets, for each pixel of pixels of the drawn line of the hand-drawn element, a pixel value to a lowest pixel value among the pixel and neighboring pixels that surround the pixel.

* * * * *